US012394945B2

(12) United States Patent
Guo et al.

(10) Patent No.: US 12,394,945 B2
(45) Date of Patent: Aug. 19, 2025

(54) PLUG CONNECTOR ASSEMBLY, RECEPTACLE CONNECTOR ASSEMBLY AND CONNECTOR ASSEMBLY WITH IMPROVED DATA TRANSMISSION SPEED

(71) Applicant: DONGGUAN LUXSHARE TECHNOLOGIES CO., LTD, Dongguan (CN)

(72) Inventors: Rongzhe Guo, Dongguan (CN); Bin Huang, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 554 days.

(21) Appl. No.: 17/884,828

(22) Filed: Aug. 10, 2022

(65) Prior Publication Data

US 2023/0137227 A1 May 4, 2023

(30) Foreign Application Priority Data

Nov. 1, 2021 (CN) ......................... 202111281307.X

(51) Int. Cl.
*H01R 13/648* (2006.01)
*H01R 12/72* (2011.01)
(Continued)

(52) U.S. Cl.
CPC ....... *H01R 13/6587* (2013.01); *H01R 12/724* (2013.01); *H01R 13/6474* (2013.01); *H01R 13/6597* (2013.01); *H01R 13/405* (2013.01)

(58) Field of Classification Search
CPC .............. H01R 13/6587; H01R 12/724; H01R 13/6474; H01R 13/6597; H01R 13/405;
(Continued)

(56) References Cited

U.S. PATENT DOCUMENTS

| | | | | |
|---|---|---|---|---|
| 5,711,686 A * | 1/1998 | O'Sullivan | ...... | H01R 13/65918 439/607.41 |
| 10,555,437 B2 * | 2/2020 | Little | ..................... | G02B 6/428 |

(Continued)

FOREIGN PATENT DOCUMENTS

| | | |
|---|---|---|
| CN | 103427222 A | 12/2013 |
| CN | 109103847 A | 12/2018 |

(Continued)

*Primary Examiner* — Abdullah A Riyami
*Assistant Examiner* — Nelson R. Burgos-Guntin
(74) *Attorney, Agent, or Firm* — Birch, Stewart, Kolasch & Birch, LLP

(57) ABSTRACT

A connector assembly includes a plug connector assembly and a receptacle connector assembly matched with each other. The plug connector assembly includes a metal shell and a plug connector. The plug connector includes a number of plug terminal modules. Each plug terminal module includes a first differential signal terminal, a first ground terminal, and a second ground terminal. The receptacle connector assembly includes a metal cage and a receptacle connector. The receptacle connector includes a number of receptacle terminal modules. Each receptacle terminal module includes a second differential signal terminal, a metal shield surrounding member surrounding a periphery of the second differential signal terminal, and a receptacle cable electrically connected to the second differential signal terminal.

20 Claims, 35 Drawing Sheets

(51) Int. Cl.

| | |
|---|---|
| ***H01R 13/6474*** | (2011.01) |
| ***H01R 13/6587*** | (2011.01) |
| ***H01R 13/6597*** | (2011.01) |
| *H01R 13/405* | (2006.01) |

(58) Field of Classification Search

CPC .......................... H01R 13/533; H01R 13/6471; H01R 13/514; H01R 13/04; H01R 13/10; H01R 13/652; H01R 13/6581; H01R 24/22; H01R 24/30

See application file for complete search history.

(56) References Cited

U.S. PATENT DOCUMENTS

| | | | | |
|---|---|---|---|---|
| 10,588,243 | B2 * | 3/2020 | Little | H01R 13/502 |
| 11,622,473 | B2 * | 4/2023 | Chiang | G02B 6/4269 439/487 |
| 11,809,003 | B2 * | 11/2023 | Togami | H05K 7/2049 |
| 2004/0224559 | A1 * | 11/2004 | Nelson | H01R 12/727 439/607.05 |
| 2005/0037655 | A1 | 2/2005 | Henry et al. | |
| 2006/0189212 | A1 * | 8/2006 | Avery | H05K 1/0245 439/607.05 |
| 2007/0021004 | A1 * | 1/2007 | Laurx | H01R 12/727 439/607.05 |
| 2009/0011644 | A1 * | 1/2009 | Amleshi | H01R 12/724 439/607.05 |
| 2013/0171885 | A1 * | 7/2013 | Zhang | H01R 13/6471 439/676 |
| 2018/0199468 | A1 | 7/2018 | Hall, III et al. | |
| 2018/0212385 | A1 * | 7/2018 | Little | H01R 13/6273 |
| 2020/0161790 | A1 * | 5/2020 | Long | H01R 13/2442 |
| 2021/0066862 | A1 * | 3/2021 | Chen | H01R 12/7076 |

FOREIGN PATENT DOCUMENTS

| | | | |
|---|---|---|---|
| CN | 113557459 | A | 10/2021 |
| JP | 2002-93528 | A | 3/2002 |

* cited by examiner

PLUG CONNECTOR ASSEMBLY, RECEPTACLE CONNECTOR ASSEMBLY AND CONNECTOR ASSEMBLY WITH IMPROVED DATA TRANSMISSION SPEED

CROSS-REFERENCE TO RELATED APPLICATION

This patent application claims priority of a Chinese Patent Application No. 202111281307. X, filed on Nov. 1, 2021 and titled "PLUG CONNECTOR ASSEMBLY, RECEPTACLE CONNECTOR ASSEMBLY AND CONNECTOR ASSEMBLY", the entire content of which is incorporated herein by reference.

TECHNICAL FIELD

The present disclosure relates to a plug connector assembly, a receptacle connector assembly and a connector assembly, which belongs to a technical field of connectors.

BACKGROUND

An existing SFP (Small Form Factor Pluggable) connector assembly usually includes an SFP receptacle connector assembly and an SFP plug connector assembly. The SFP receptacle connector assembly usually includes a metal cage and an SFP receptacle connector located in the metal cage. The SFP receptacle connector includes an insulating body and a plurality of conductive terminal modules which are assembled to the insulating body and arranged at intervals. Each conductive terminal module includes an insulating bracket and a plurality of conductive terminals insert-molded with the insulating bracket. Among the plurality of conductive terminal modules, some conductive terminal modules are signal terminal modules, and some conductive terminal modules are ground terminal modules. After assembling, the plurality of conductive terminal modules are disposed next to each other. Two adjacent signal terminal modules form a differential pair. It should be noted that two signal terminals of the differential pair are located on different terminal modules.

The SFP plug connector assembly usually includes a built-in circuit board, a cable connected to the built-in circuit board, and a shell enclosing the built-in circuit board. The built-in circuit board includes a tongue plate portion and a plurality of gold fingers provided on a surface of the tongue plate portion.

When the SFP plug connector assembly is inserted into the SFP receptacle connector assembly and plugged in place, the gold fingers on the tongue plate portion contact the conductive terminals of the SFP receptacle connector so as to transmit data.

However, with the continuous improvement of the data transmission requirements of the connector assembly, there is still room for improvement of the existing connector assembly.

SUMMARY

An object of the present disclosure is to provide a plug connector assembly, a receptacle connector assembly, and a connector assembly which are compact in layout and easy to realize high-speed data transmission.

In order to achieve the above object, the present disclosure adopts the following technical solution: a plug connector assembly, including: a metal shell, the metal shell including a first end surface and an installation space extending through the first end surface; and a plug connector, the plug connector being at least partially received in the installation space, the plug connector including a plug housing and a plurality of plug terminal modules, the plurality of plug terminal modules being arranged side by side and assembled to the plug housing; wherein at least one plug terminal module includes a plurality of plug conductive terminals, the plurality of plug conductive terminals include a first differential signal terminal, a first ground terminal and a second ground terminal, and the first differential signal terminal is located between the first ground terminal and the second ground terminal.

In order to achieve the above object, the present disclosure adopts the following technical solution: a receptacle connector assembly, including: a metal cage, the metal cage including a second end surface and a mating space extending through the second end surface; and a receptacle connector, the receptacle connector being located at a rear end of the mating space and communicating with the mating space, the receptacle connector including a receptacle housing and a plurality of receptacle terminal modules assembled to the receptacle housing; wherein at least one receptacle terminal module includes a second differential signal terminal, a grounding element, and a receptacle cable electrically connected to the second differential signal terminal.

In order to achieve the above object, the present disclosure adopts the following technical solution: a connector assembly, including a plug connector assembly and a receptacle connector assembly which are matched with each other, the plug connector assembly including: a metal shell, the metal shell including an installation space; and a plug connector, the plug connector being at least partially received in the installation space, the plug connector including a plug housing and a plurality of plug terminal modules, the plurality of plug terminal modules being arranged side by side and assembled to the plug housing; wherein at least one plug terminal module includes an insulating bracket and a plurality of plug conductive terminals fixed to the insulating bracket, and the plurality of plug conductive terminals include a first differential signal terminal; the receptacle connector assembly including: a metal cage, the metal cage including a mating space; and a receptacle connector, the receptacle connector being located at a rear end of the mating space and communicating with the mating space, the receptacle connector including a receptacle housing and a plurality of receptacle terminal modules assembled to the receptacle housing; wherein at least one receptacle terminal module includes a second differential signal terminal and a receptacle cable electrically connected to the second differential signal terminal; and wherein the plug connector assembly is at least partially inserted into the mating space, so that the first differential signal terminal and the second differential signal terminal are in contact with each other.

Compared with the prior art, at least one plug terminal module of the plug connector assembly of the present disclosure includes a first differential signal terminal, a first ground terminal, and a second ground terminal; and the first differential signal terminal is located between the first ground terminal and the second ground terminal. By arranging the first differential signal terminal, the first ground terminal, and the second ground terminal on a single plug terminal module, the arrangement of the first differential signal terminal, the first ground terminal and the second ground terminal becomes more compact, and it is beneficial to increase the speed of data transmission. Besides, at least one receptacle terminal module of the receptacle connector assembly of the present disclosure includes a second differential signal terminal, a metal shield surrounding member surrounding a periphery of the second differential signal terminal, and a receptacle cable electrically connected to the second differential signal terminal. By arranging the second differential signal terminal on the receptacle terminal module, the arrangement of the second differential signal terminal becomes more compact, and it is beneficial to increase the data transmission speed. In addition, by matching the plug connector assembly with the receptacle connector assembly, the data transmission speed is improved.

DETAILED DESCRIPTION

Figure 1:
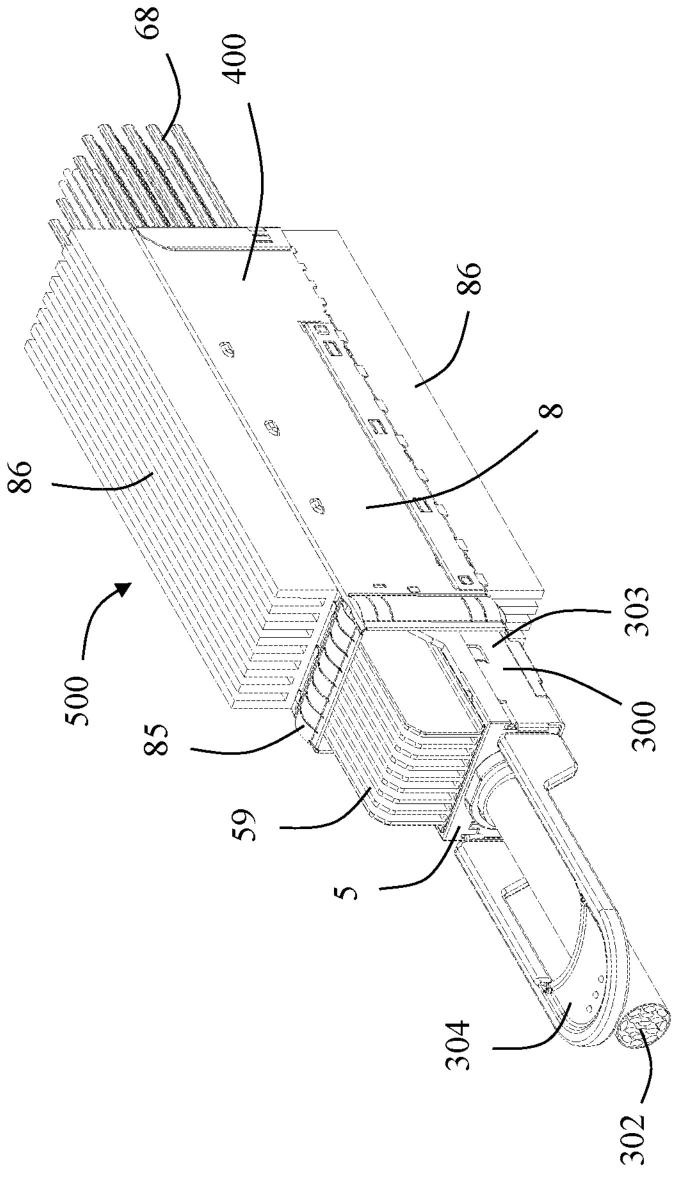
FIG. 1 is a perspective schematic view of a connector assembly in accordance with an embodiment of the present disclosure, in which a plug connector assembly is inserted into a receptacle connector assembly.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
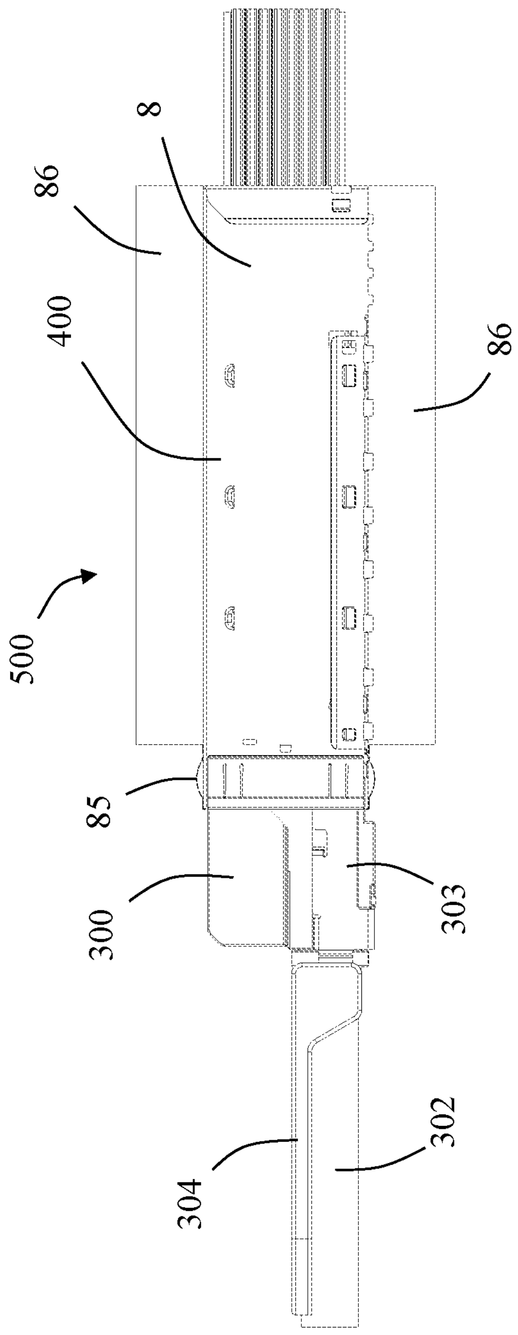
FIG. 2 is a right side view of FIG. 1.
Figure 3:
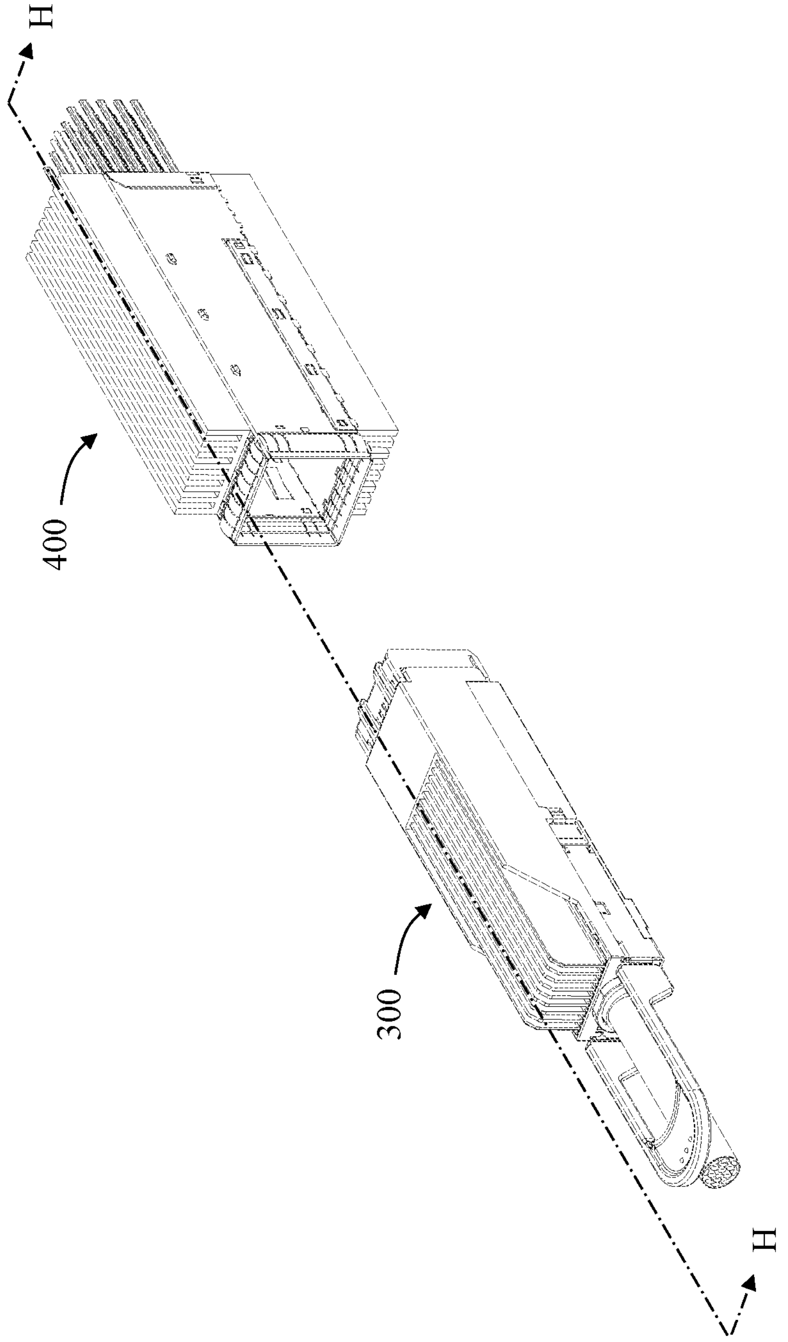
FIG. 3 is a partially exploded perspective view of FIG. 1.
Figure 4:
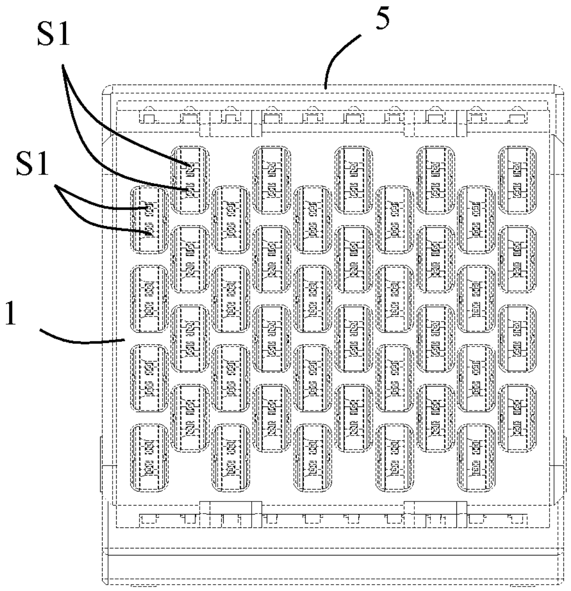
FIG. 4 is a front view of the plug connector assembly in FIG. 3.
Figure 5:
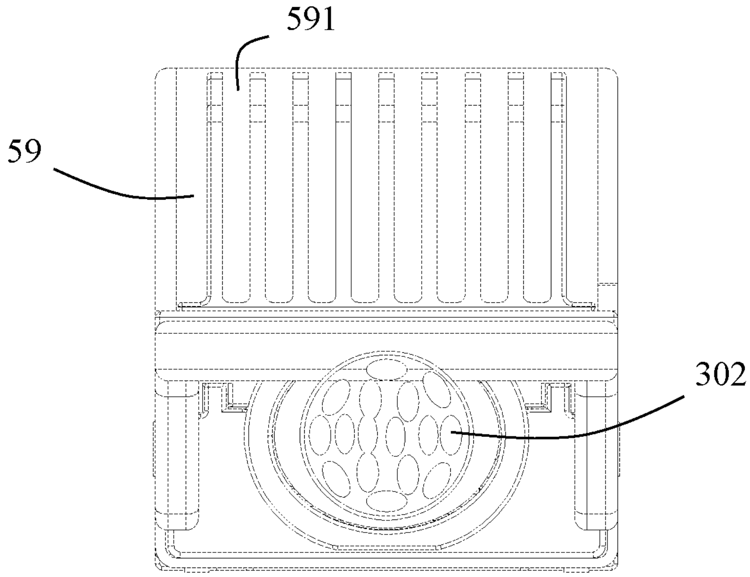
FIG. 5 is a rear view of FIG. 4.
Figure 6:
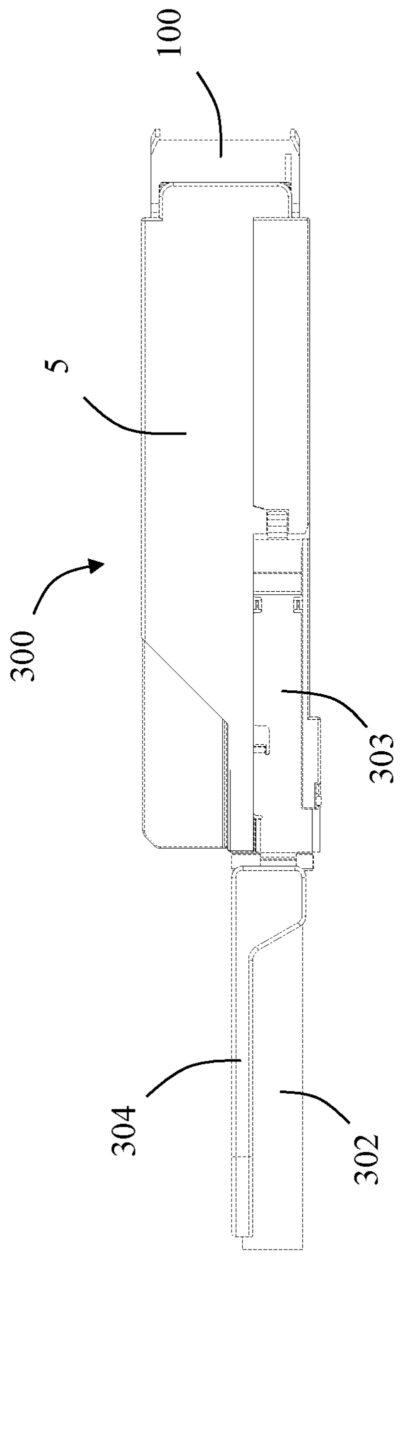
FIG. 6 is a right side view of the plug connector assembly in FIG. 3.
Figure 7:
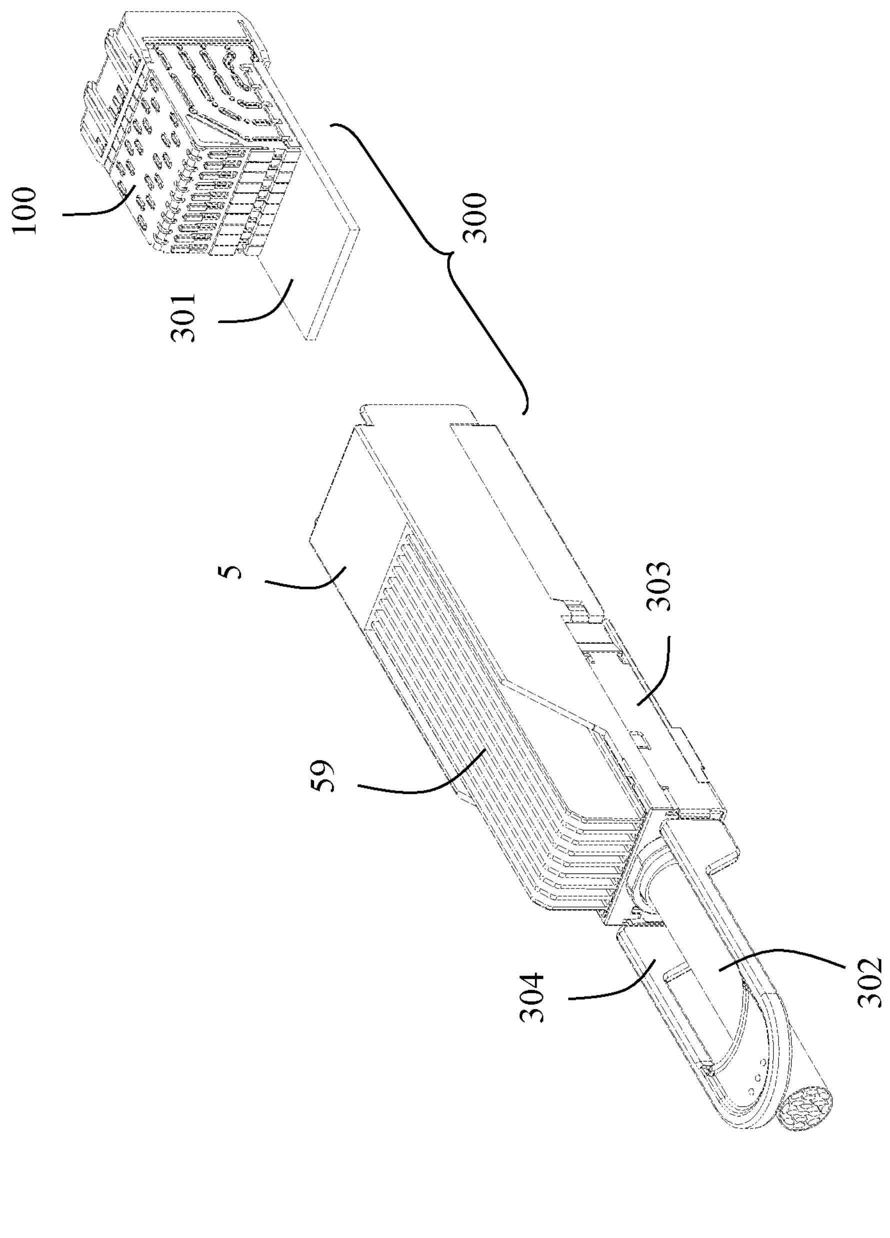
FIG. 7 is a partial perspective exploded view of FIG. 6, in which a plug connector and a built-in circuit board are separated.
Figure 8:
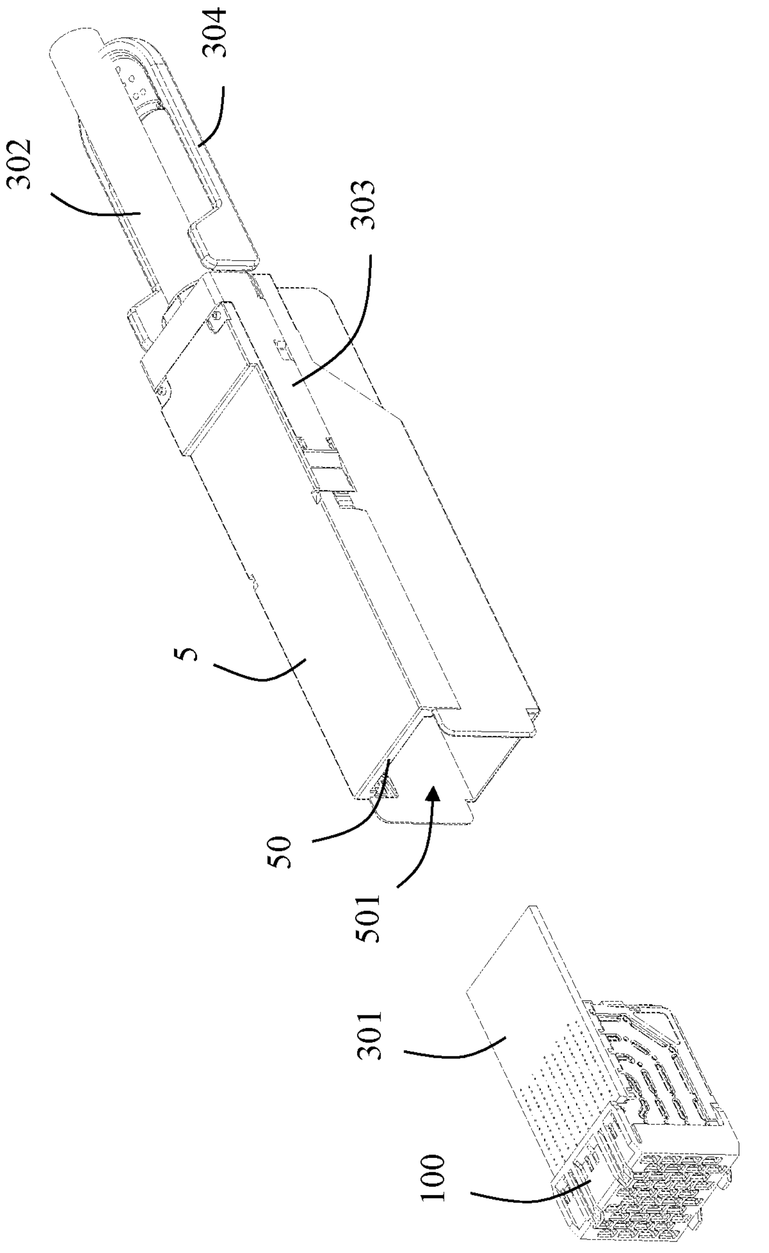
FIG. 8 is a partial perspective exploded view of FIG. 7 from another angle.
Figure 9:
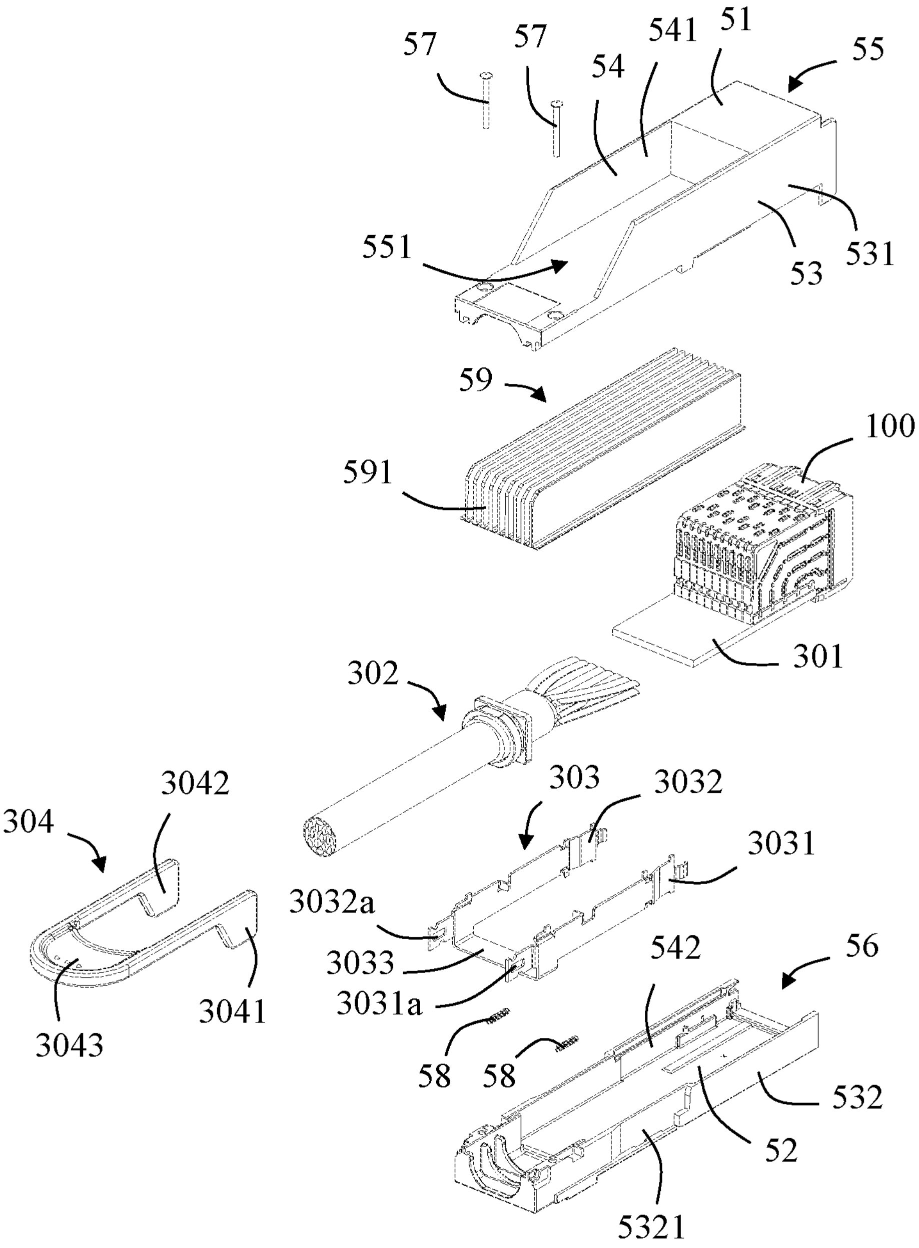
FIG. 9 is a perspective exploded view of the plug connector assembly in FIG. 3.
Figure 10:
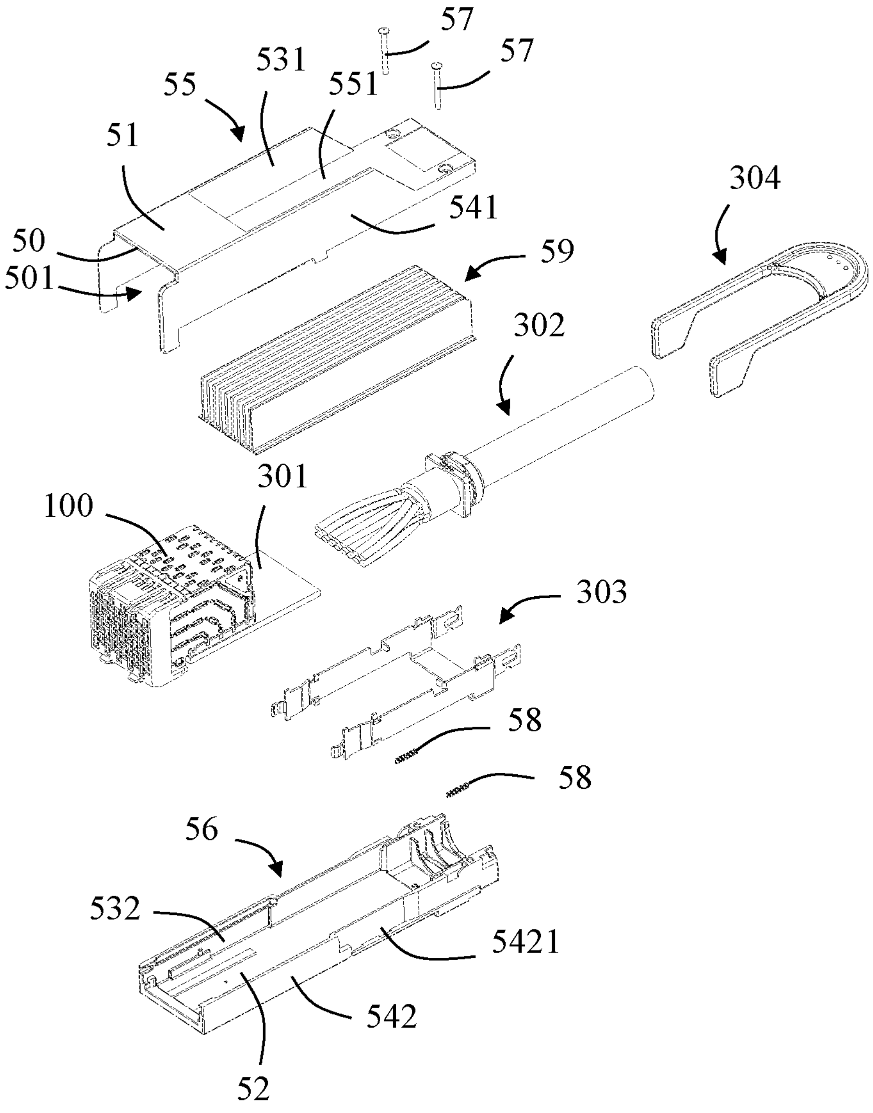
FIG. 10 is a perspective exploded view of FIG. 9 from another angle.

Referring to FIGS. 1 to 3, the present disclosure discloses a connector assembly 500 including a plug connector assembly 300 and a receptacle connector assembly 400. The plug connector assembly 300 is adapted to be inserted into the receptacle connector assembly 400 so as to realize transmission of high-speed signals, control signals, and power, etc.

Referring to FIGS. 4 to 10, the plug connector assembly 300 includes a metal shell 5 and a plug connector 100 at least partially installed in the metal shell 5. In the illustrated embodiment of the present disclosure, the plug connector 100 is a backplane connector. The plug connector 100 is located at a front end of the metal shell 5. It is understandable to those skilled in the art that the backplane connector generally includes a plurality of terminal modules. Each terminal module includes multiple groups of differential signal terminals. By providing the differential signal terminals, the data transmission speed of the plug connector assembly 300, the receptacle connector assembly 400 and the connector assembly 500 can be improved, and the miniaturization of the connector assemblies can be achieved.

The metal shell 5 includes a first end surface 50 and an installation space 501 extending through the first end surface 50. The plug connector 100 is at least partially received in the installation space 501. In the illustrated embodiment of the present disclosure, the metal shell 5 includes a first top wall 51, a first bottom wall 52, a first side wall 53 and a second side wall 54. The installation space 501 is at least jointly enclosed by the first top wall 51, the first bottom wall 52, the first side wall 53 and the second side wall 54. Specifically, the metal shell 5 includes a first metal shell 55 and a second metal shell 56 assembled together. The first metal shell 55 includes the first top wall 51, a first side wall portion 531 extending downwardly from one side of the first top wall 51, and a second side wall portion 541 extending downwardly from the other side of the first top wall 51. The second metal shell 56 includes the first bottom wall 52, a third side wall portion 532 extending upwardly from one side of the first bottom wall 52, and a fourth side wall portion 542 extending upwardly from the other side of the first bottom wall 52. The first side wall portion 531 and the third side wall portion 532 are located on a same side of the metal shell 5. The first side wall 53 includes the first side wall portion 531 and the third side wall portion 532. Similarly, the second side wall portion 541 and the fourth side wall portion 542 are located on a same side of the metal shell 5. The second side wall 54 includes the second side wall portion 541 and the fourth side wall portion 542. In the illustrated embodiment of the present disclosure, a length of the metal shell 5 extending in a mating direction (i.e., a front-to-rear direction) is much longer than a length of the plug connector 100 after a plug cable 302 is removed, which is beneficial to improve the shielding effect of the plug connector 100. When the plug connector assembly 300 is just inserted into the receptacle connector assembly 400, static electricity can be discharged through the metal shell 5, thereby avoiding adverse effects on the connection between plug conductive terminals and receptacle conductive terminals.

In an embodiment of the present disclosure, both the first metal shell 55 and the second metal shell 56 are casted from metal materials, so as to facilitate manufacturing and improve the shielding performance of the first metal shell 55 and the second metal shell 56. The first metal shell 55 and the second metal shell 56 are fixed together by bolts 57.

In addition, the first metal shell 55 includes an opening 551 located between the first side wall portion 531 and the second side wall portion 541. The metal shell 5 includes a plug heat sink 59 installed in the opening 551. The plug heat sink 59 includes a plurality of heat dissipation channels 591 arranged at intervals.

In the illustrated embodiment of the present disclosure, the plug connector assembly 300 further includes a built-in circuit board 301, a plug cable 302, an unlocking assembly 303 mounted on the metal shell 5, and a pull strap 304 connected to the unlocking assembly 303. The plug connector 100 is mounted on the built-in circuit board 301. The plug cable 302 is electrically connected to the plug connector 100 through the built-in circuit board 301. Of course, in other embodiments, the plug cable 302 can also be directly electrically connected to the plug connector 100.

The unlocking assembly 303 is substantially U-shaped, and includes a first locking side wall 3031, a second locking side wall 3032, and a connection bottom wall 3033 connecting the first locking side wall 3031 and the second locking side wall 3032. The first locking side wall 3031 includes a first protrusion **3031*a* protruding backwardly from the connection bottom wall 3033. The second locking side wall 3032 includes a second protrusion 3032*a* protruding backwardly from the connection bottom wall 3033**.

The third side wall portion 532 of the second metal shell 56 is provided with a first slot 5321 for receiving the first locking side wall 3031. The fourth side wall 542 of the second metal shell 56 is provided with a second slot 5421 for receiving the second locking side wall 3032. In addition, the plug connector 100 further includes compression springs 58 received in the third side wall portion 532 and the fourth side wall portion 542, and abutting against the first locking side wall 3031 and the second locking side wall 3032.

The pull strap 304 includes a first coupling portion 3041 fixed to the first protrusion **3031*a*, a second coupling portion 3042 fixed to the second protrusion 3032*a*, and a force applying portion 3043 connecting the first coupling portion 3041 and the second coupling portion 3042. In an embodiment of the present disclosure, the first protrusion 3031*a* is insert-molded with the first coupling portion 3041, and the second protrusion 3032*a* is insert-molded with the second coupling portion 3042**.

The unlocking assembly 303 is slidable back and forth under the action of the pull strap 304. When unlocking is required, a backward force is applied to the force applying portion 3043 of the pull strap 304, the unlocking assembly 303 overcomes the elastic force of the compression springs 58, so that the first locking side wall 3031 and the second locking side wall 3032 move backwardly so as to realize unlocking. When the force disappears, the compression springs 58 release part of the elastic force, so that the unlocking assembly 303 moves forwardly and resets.

Figure 11:
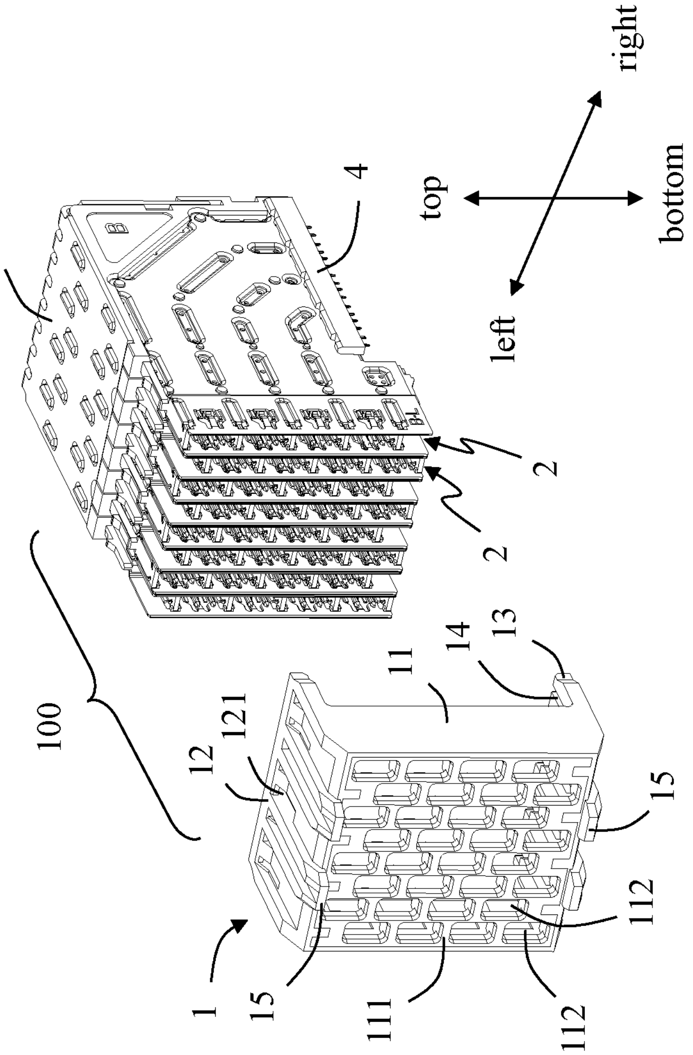
FIG. 11 is a partial perspective exploded view of the plug connector in FIG. 10.
Figure 12:
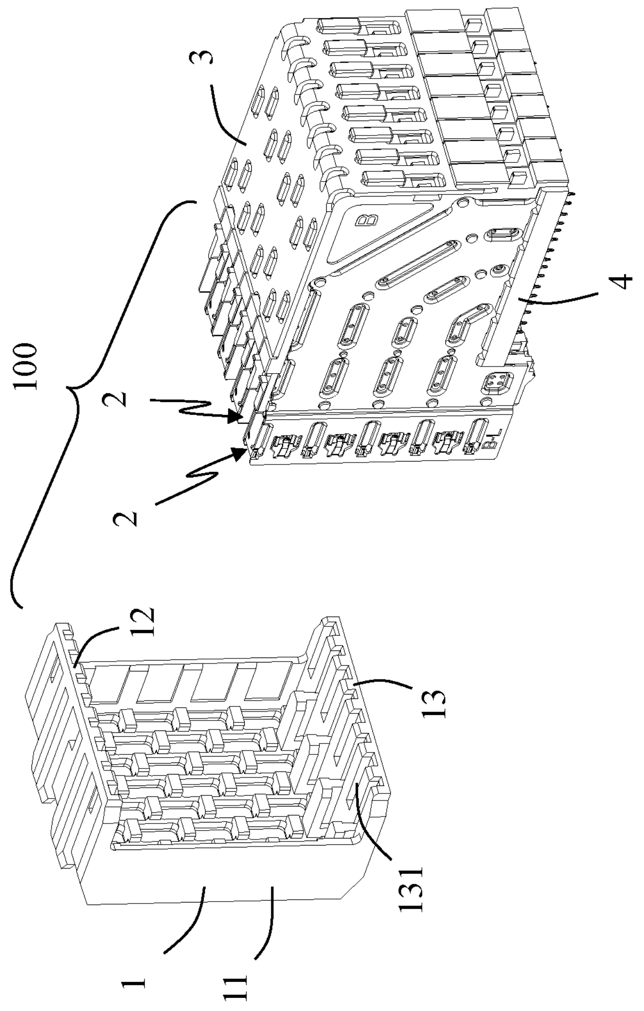
FIG. 12 is a partially exploded perspective view of FIG. 11 from another angle.

Referring to FIGS. 11 and 12, the plug connector 100 includes a plug housing 1, a plurality of plug terminal modules 2 at least partially assembled to the plug housing 1, a spacer 3 held on the plurality of plug terminal modules 2, and a mounting block 4 held at the bottom of the plurality of plug terminal modules 2. The plurality of plug terminal modules 2 are disposed side by side along a left-right direction.

The plug housing 1 includes a first base 11, a first extension wall 12 extending rearwardly from a top end of the first base 11, and a second extension wall 13 extending rearwardly from a bottom end of the first base 11. The first base 11 includes a mating surface 111 and a plurality of terminal mating grooves 112 extending through the mating surface 111. The terminal mating grooves 112 are arranged in multiple rows along a first direction (i.e., a left-right direction). Two adjacent rows of terminal mating grooves 112 are staggered and arranged in a second direction (i.e., a top-bottom direction) perpendicular to the first direction. That is, the terminal mating grooves 112 at corresponding positions in the two adjacent rows of terminal mating grooves 112 are not aligned in the left-right direction. This arrangement is beneficial to reduce the signal crosstalk between two adjacent plug terminal modules 2. The first extension wall 12 and the second extension wall 13 are provided with a plurality of first installation slots 14 for receiving the plurality of plug terminal modules 2. The first extension wall 12 and the second extension wall 13 are respectively provided with positioning protrusions 15 protruding beyond the mating surface 111. The first extension wall 12 is provided with a plurality of first locking grooves 121 extending upwardly through the first extension wall 12.

The second extension wall 13 is provided with a plurality of second locking grooves 131 extending downwardly through the second extension wall 13. The first locking grooves 121 and the second locking grooves 131 are used to lock the plug terminal module 2 so as to prevent the plug terminal modules 2 from escaping from the plug housing 1.

Referring to FIGS. 13 to 16, each plug terminal module 2 includes an insulating bracket 21 inserted into the first installation slot 14, a plurality of plug conductive terminals 22 fixed to the insulating bracket 21, and a metal shield located at least on one side of the insulating bracket 21. In the illustrated embodiment of the present disclosure, the metal shield includes a first metal shield 23 fixed on one side (i.e., a left side) of the insulating bracket 21 and a second metal shield 24 fixed on the other side (i.e., a right side) of the insulating bracket 21.

Figure 13:
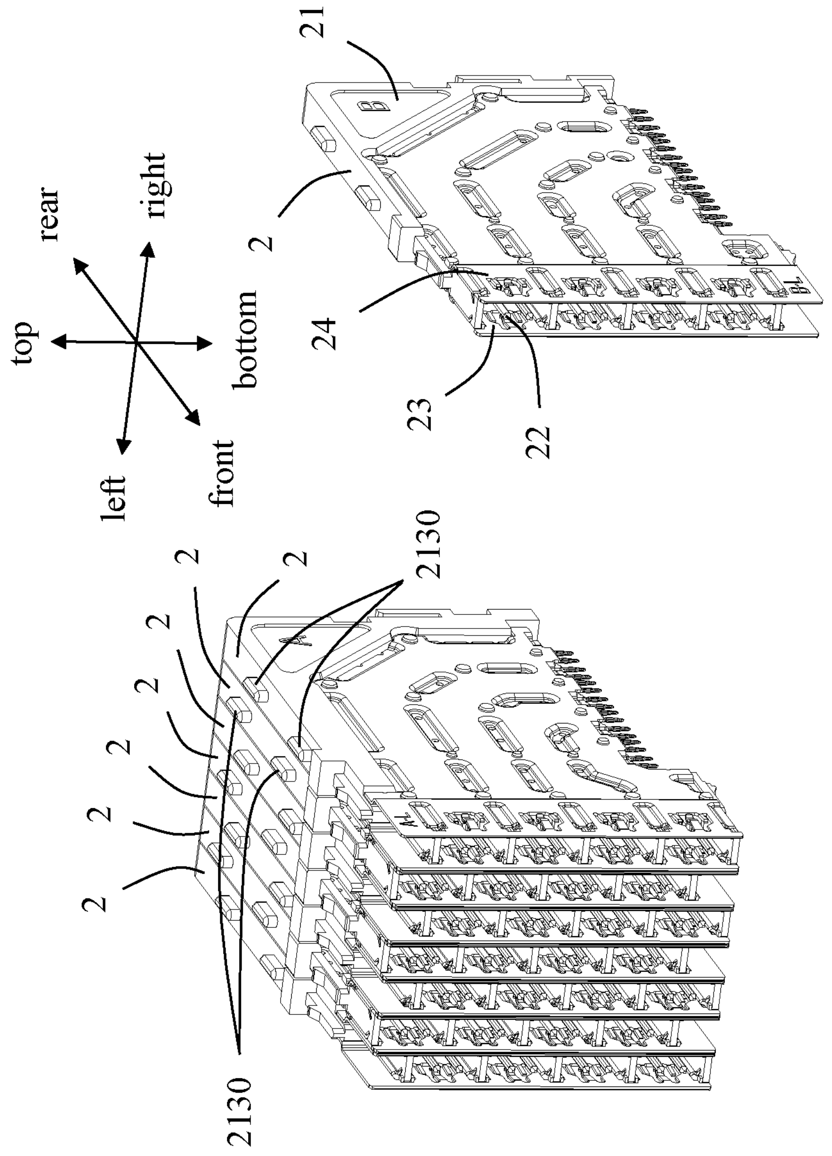
FIG. 13 is a partial perspective exploded view of the plug connector of the present disclosure, in which one plug terminal module is separated.
Figure 16:
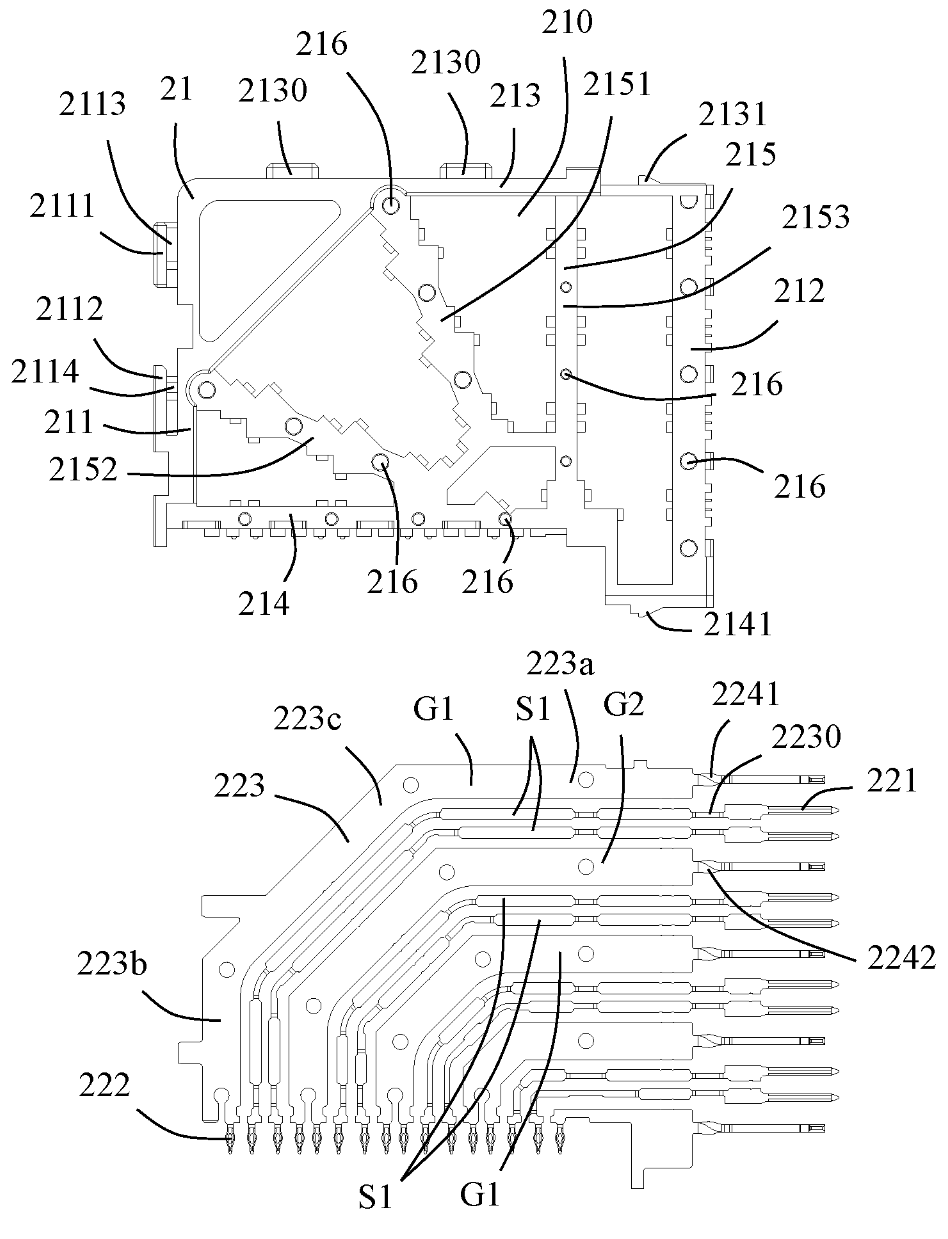
FIG. 16 is a side view of an insulating bracket and plug conductive terminals separated from the insulating bracket.

Referring to FIG. 16, the insulating bracket 21 is roughly frame-shaped. The insulating bracket 21 includes a rear wall 211, a front wall 212 opposite to the rear wall 211, a top wall 213 connecting one side of the rear wall 211 and one side of the front wall 212, a bottom wall 214 connecting the other side of the rear wall 211 and the other side of the front wall 212, and a plurality of connecting walls 215. The connecting wall 215 is capable of enhancing the structural strength of the frame. The rear walls 211 of the insulating brackets 21 include a plurality of first protrusions 2111 protruding backwardly and spaced apart from each other in the left-right direction. The top walls 213 of the insulating brackets 21 includes a plurality of second protrusions 2130 protruding upwardly and spaced apart from each other in the left-right direction. Referring to FIG. 13, in the illustrated embodiment of the present disclosure, each plug terminal module 2 includes two second protrusions 2130 which are spaced apart from each other along the front-rear direction. The second protrusions 2130 of two adjacent plug terminal modules 2 are staggered in the front-rear direction. That is, the second protrusions 2130 at the corresponding positions of two adjacent plug terminal modules 2 are not in alignment with each other in the left-right direction. An extending direction (i.e., the top-bottom direction) of the first protrusion 2111 is perpendicular to an extending direction (i.e., the front-rear direction) of the second protrusion 2130.

Besides, the insulating bracket 21 further includes a plurality of third protrusions 2112 disposed at intervals from the first protrusions 2111. The first protrusions 2111 and the corresponding third protrusions 2112 are in alignment with each other along the top-bottom direction. The first protrusion 2111 includes a first constriction portion 2113, and the third protrusion 2112 includes a second constriction portion 2114. In the illustrated embodiment of the present disclosure, the insulating bracket 21 has a hollow portion 210. The connecting walls 215 include a first connecting wall 2151 connecting the top wall 213 and the bottom wall 214, and a second connecting wall 2152 connecting the rear wall 211 and the bottom wall 214. The first connecting wall 2151 and the second connecting wall 2152 are disposed obliquely. One ends of the first connecting wall 2151 and the second connecting wall 2152 are adjacent to each other, and the other ends are spread out so as to form a radial shape. The connecting walls 215 further include a first reinforcing wall 2153 connecting the top wall 213 and the bottom wall 214. The first reinforcing wall 2153 is parallel to the first front wall 212. Referring to FIG. 16, a width of the first reinforcing wall 2153 is smaller than a width of the first front wall 212. The first connecting wall 2151 and the second connecting wall 2152 are exposed in the hollow portion 210. The top wall 213 includes a first locking protrusion 2131 for being locked in the first locking groove 121. The bottom wall 214 includes a second locking protrusion 2141 for being locked in the second locking groove 131.

Figure 14:
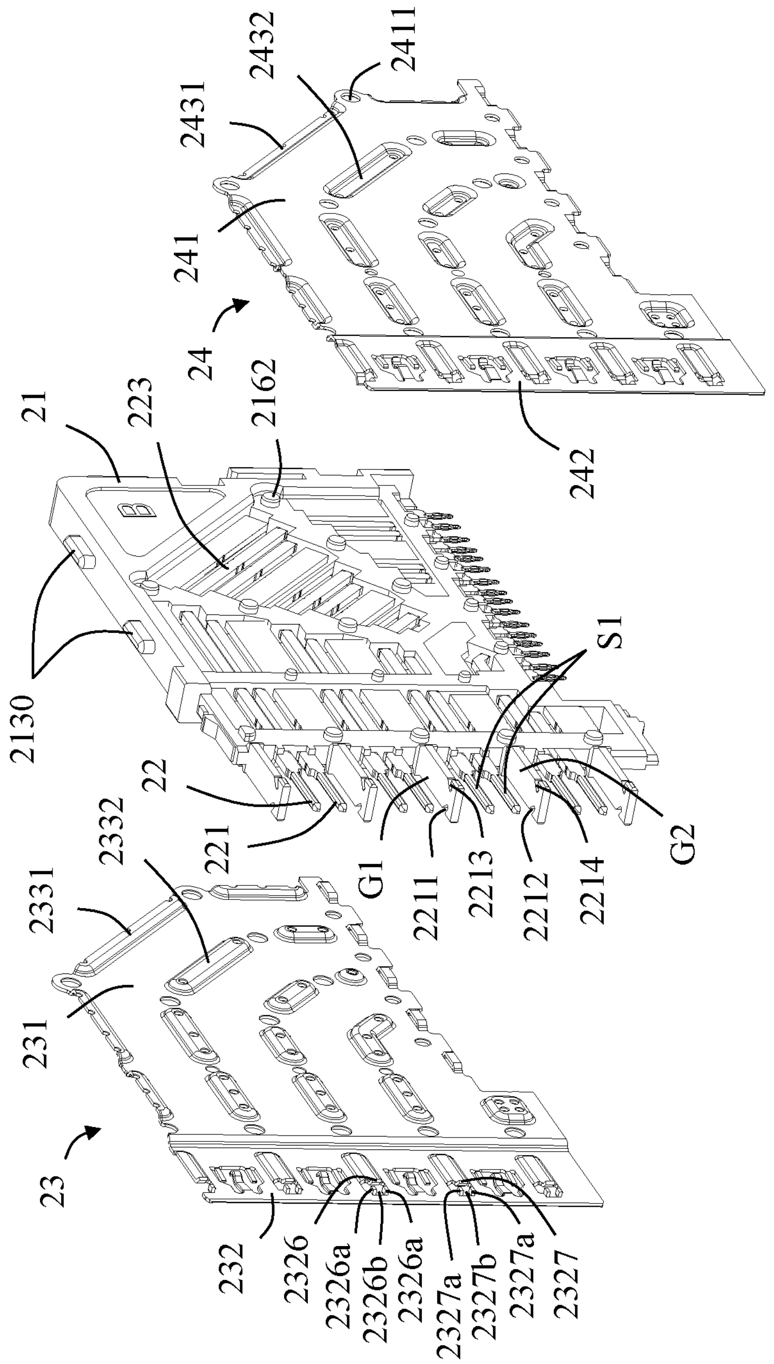
FIG. 14 is a partial perspective exploded view of the plug terminal module in FIG. 13.
Figure 15:
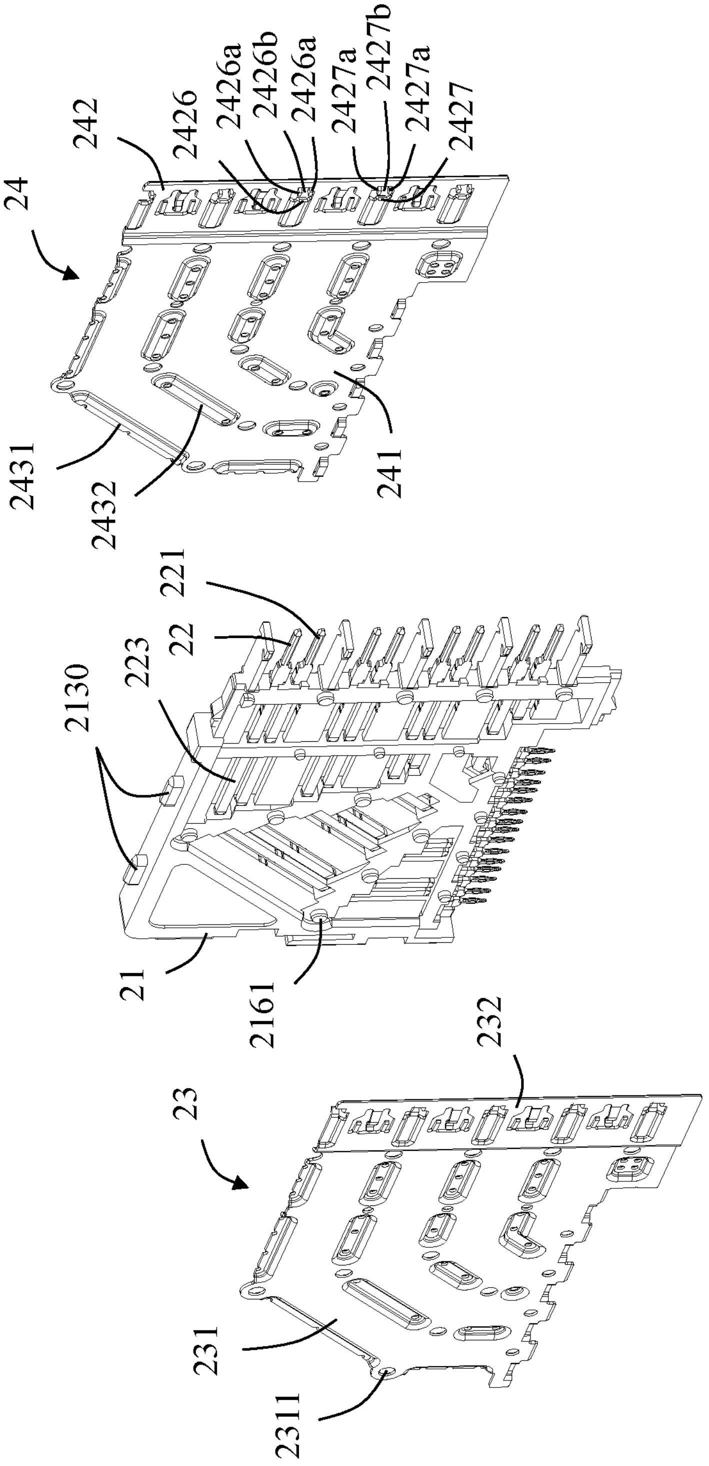
FIG. 15 is a partial perspective exploded view of FIG. 14 from another angle.

Referring to FIGS. 14 to 16, the insulating bracket 21 further includes a plurality of posts 216 for fixing the first metal shield 23 and the second metal shield 24. In the illustrated embodiment of the present disclosure, the posts 216 are substantially cylindrical. In the illustrated embodiment of the present disclosure, the posts 216 are disposed on the bottom wall 214, the first connecting wall 2151, the second connecting wall 2152, the first reinforcing wall 2153 and the front wall 212. The first metal shield 23 and the second metal shield 24 are respectively located on opposite sides of the insulating bracket 21. The posts 216 include a plurality of first posts 2161 and a plurality of second posts 2162. The first posts 2161 and the second posts 2162 are respectively disposed on opposite sides of the insulating bracket 21 so as to be fixed and positioned with the first metal shield 23 and the second metal shield 24, respectively.

Referring to FIG. 16, each group of plug conductive terminals 22 includes a mating portion 221, a tail portion 222 and a first connection portion 223 connecting the mating portion 221 and the tail portion 222. The mating portions 221 extend beyond the insulating bracket 21. Some of the mating portions 221 are adapted to electrically connect with the receptacle connector assembly 400. The tail portions 222 are used for being mounted to the circuit board 301. In the illustrated embodiment of the present disclosure, the mating portion 221 is substantially perpendicular to the tail portion 222. The first connection portion 223 is curved. Specifically, the first connection portion 223 includes a first section 223*a* parallel to the mating portion 221, a second section 223*b* parallel to the tail portion 222, and a third section 223*c* connecting the first section 223*a* and the second section 223*b*. Referring to FIG. 16, the first section 223*a* extends horizontally, the second section 223*b* extends vertically, and the third section 223*c* extends obliquely.

Each group of plug conductive terminals 22 include a plurality of first ground terminals G1, a plurality of second ground terminals G2, and a plurality of first signal terminals S1. In the illustrated embodiment of the present disclosure, two adjacent first signal terminals S1 form a pair of first differential signal terminals. Each pair of first differential signal terminals are located between one first ground terminal G1 and one second ground terminal G2. That is, each group of plug conductive terminals 22 are disposed in a manner of G1-S1-S1-G2, which is beneficial to improve the quality of signal transmission. The first differential signal terminals are narrow-side coupling or wide-side coupling. A width of the first ground terminal G1 and a width the second ground terminal G2 are greater than a width of each first signal terminal S1 which is located between the first ground terminal G1 and the second ground terminal G2. Therefore, it is beneficial to increase the shielding area and improve the shielding effect. The mating portion 221 of the first differential signal terminal is exposed in the corresponding terminal mating groove 112. In some embodiments of the present disclosure, the plug cable 302 may also be directly electrically connected to the first differential signal terminal. Compared with a circuit board, by having the first differential signal terminal directly transmit data through the plug cable 302, it is beneficial to improve the speed and quality of data transmission.

In the illustrated embodiment of the present disclosure, the first connection portions 223 of the plug conductive terminals 22 are insert-molded with the insulating bracket 21. The first connection portions 223 of the differential signal terminals, the first connection portion 223 of the first ground terminal G1 and the first connection portion 223 of the second ground terminal G2 are all exposed in the same hollow portion 210. Each first connection portion 223 of the first signal terminals S1 includes a narrowed portion 2230 insert-molded with the insulating bracket 21 so as to adjust the impedance of the first signal terminals S1 for achieving impedance matching. In the illustrated embodiment of the present disclosure, the mating portions 221 of the first signal terminals S1 are substantially needle-shaped. The mating portions 221 of the first ground terminal G1 and the second ground terminal G2 are substantially rectangular-shaped. The mating portions 221 of the first signal terminals S1 and the first connection portions 223 of the plug conductive terminals 22 are coplanar, which means they are located in a first plane (i.e., a horizontal plane). It should be noted that the technical term "coplanar" used in the present disclosure is intended to indicate that related components are substantially flush, which includes situations of incomplete coplanarity caused by manufacturing tolerances. However, in the illustrated embodiment of the present disclosure, the first ground terminal G1 includes a first torsion portion 2241 connected between its mating portion 221 and its first section **223*a*, so that the mating portion 221 of the first ground terminal G1 is located in a second plane (i.e., a vertical plane) perpendicular to the first plane. The second ground terminal G2 includes a second torsion portion 2242 connected between its mating portion 221 and its first section 223*a*, so that the mating portion 221 of the second ground terminal G2 is also located in the second plane (i.e., the vertical plane) perpendicular to the first plane. The mating portion 221 of the first ground terminal G1 and the mating portion 221 of the second ground terminal G2** are parallel to each other.

As shown in FIG. 16, each plug terminal module 2 includes multiple pairs of first differential signal terminals in order to increase the speed of signal transmission. Among the first differential signal terminals in different pairs, an average length of the first differential signal terminals located on an outer side is greater than an average length of the first differential signal terminals located on an inner side. Among the first differential signal terminals in a same pair, a length of the first signal terminal S1 located on an outer side is greater than a length of the first signal terminal S1 located on an inner side.

Referring to FIGS. 12 to 16, in the illustrated embodiment of the present disclosure, each plug terminal module 2 is located in a vertical plane as a whole. The first ground terminals G1, the first differential signal terminals, and the second ground terminals G2 are stacked and separated by a certain distance in the vertical plane. The first differential signal terminals are divided into least three pairs. Each pair of the first differential signal terminals is located between one first ground terminal G1 and one second ground terminal G2. In the illustrated embodiment of the present disclosure, the number of the plug terminal modules 2 is at least five and they are arranged side by side. Any two adjacent plug terminal modules 2 are arranged next to each other. That is, a front end (a mating end) of each plug terminal module 2 is close to the adjacent plug terminal module 2.

Figure 17:
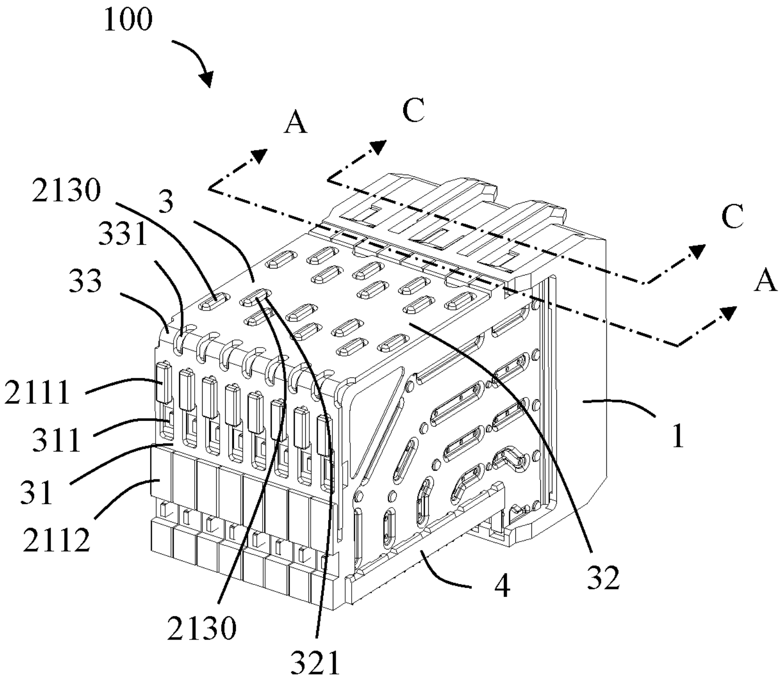
FIG. 17 is a perspective schematic view of the plug connector in FIG. 3 from another angle.
Figure 18:
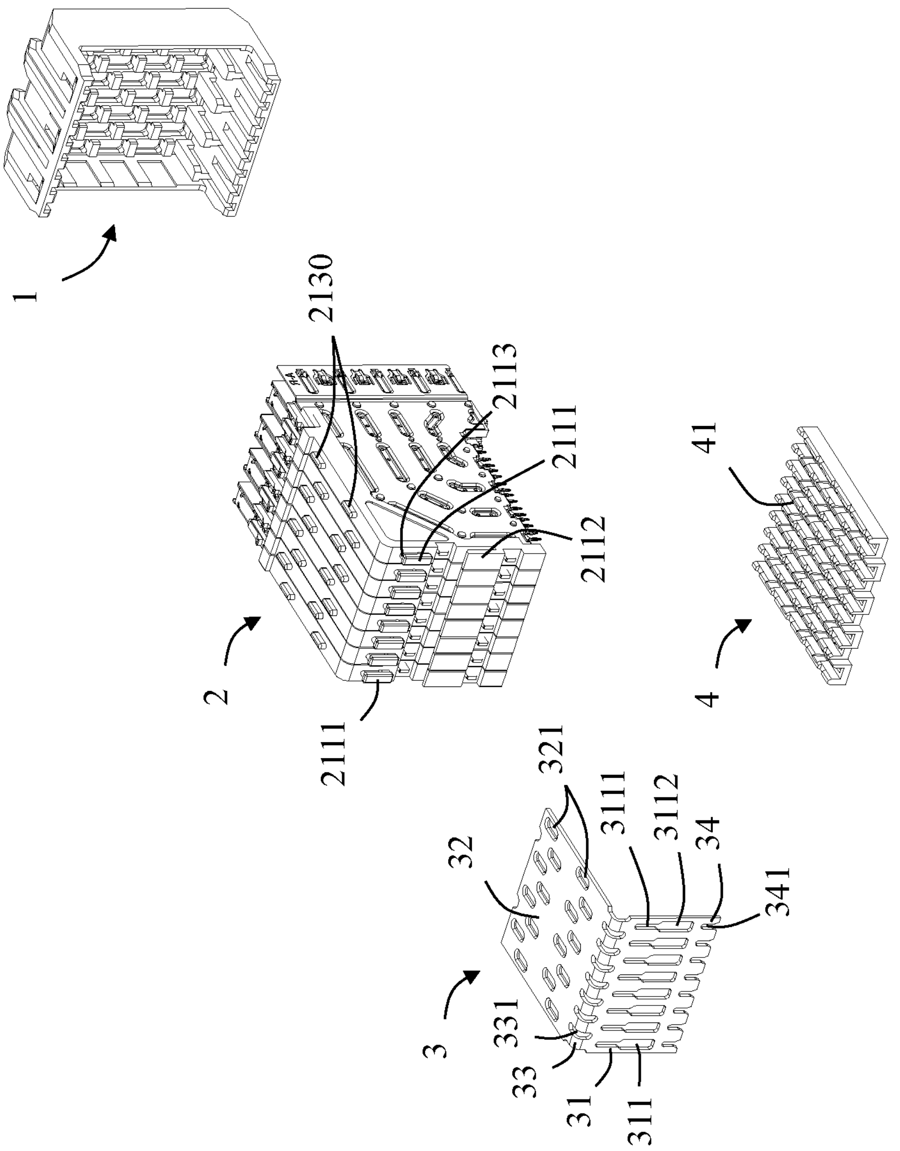
FIG. 18 is a partially exploded perspective view of FIG. 17.
Figure 19:
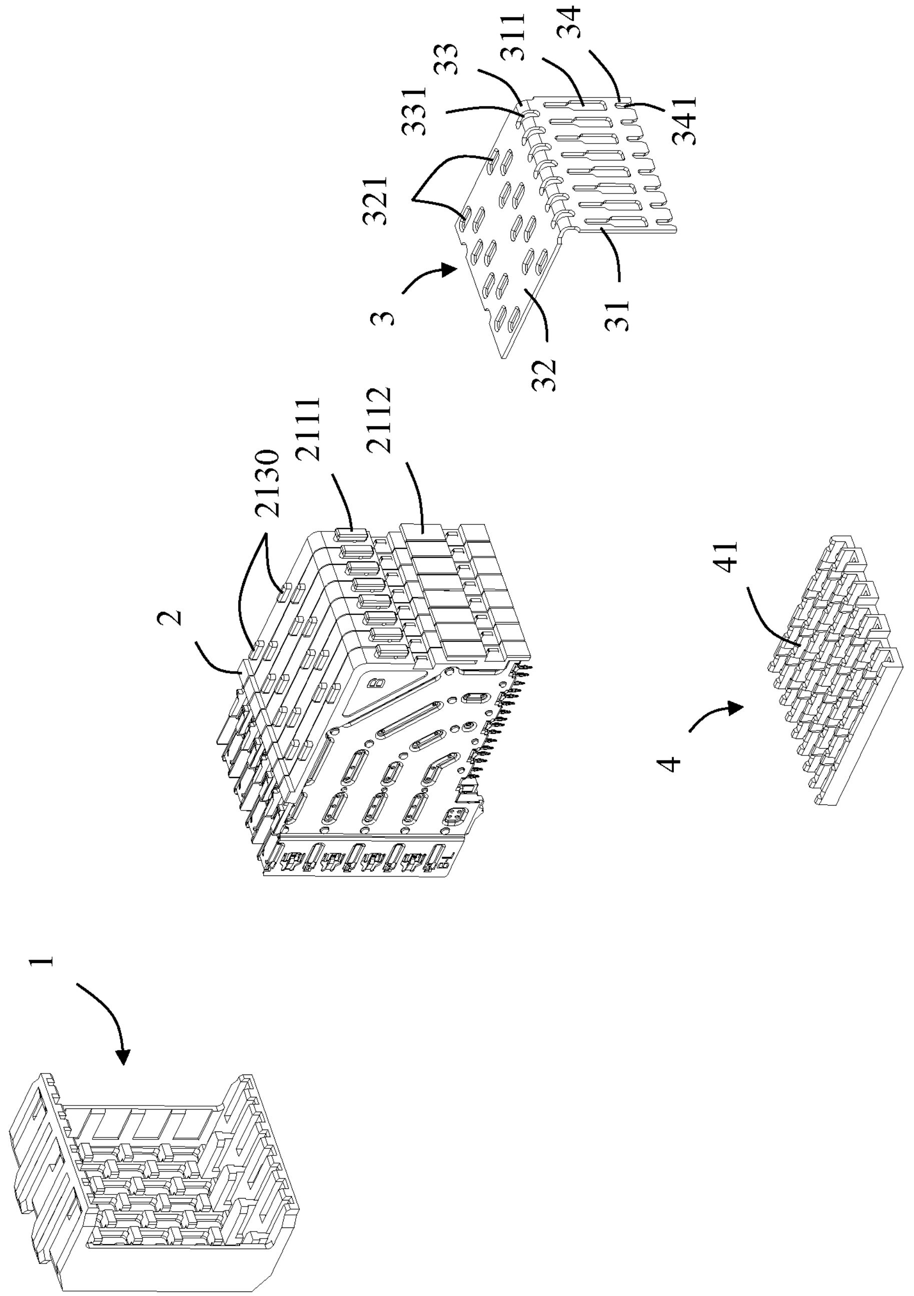
FIG. 19 is a partially exploded perspective view of FIG. 18 from another angle.

Referring to FIGS. 17 to 19, in the illustrated embodiment of the present disclosure, the spacer 3 is made of a metal material or an insulating material. The spacer 3 is used to assemble the plurality of plug terminal modules 2 together. The spacer 3 includes a first body portion 31, a second body portion 32, a bending portion 33 connecting the first body portion 31 and the second body portion 32, and a protruding piece 34 extending downwardly from the first body portion 31. The first body portion 31 is perpendicular to the second body portion 32. The first body portion 31 includes a plurality of first slots 311 for holding the first protrusions 2111. The second body portion 32 includes a plurality of second slots 321 for holding the second protrusions 2130. The protrusion piece 34 is provided with a plurality of slits 341 corresponding to the third protrusions 2112, so that the protrusion piece 34 is substantially comb-shaped. Each first slot 311 is a closed slot, which means a periphery of the first slot 311 is surrounded by the first body portion 31. Each slit 341 is a non-closed slit, which means one end (i.e., a bottom end) of the slit 341 is opened. The slits 341 and the corresponding first slots 311 are spaced apart and aligned along the top-bottom direction. The first slot 311 includes a first slit 3111 and a second slit 3112 having a width larger than the first slit 3111. The first slit 3111 is located above the second slit 3112 and communicates with the second slit 3112. The slit 341 is located below the second slit 3112. The bending portion 33 includes with a plurality of openings 331 spaced apart along the left-right direction, so as to facilitate bending and control bending accuracy.

When assembling the spacer 3 to the plurality of plug terminal modules 2, firstly, the second slits 3112 of the spacer 3 correspond to the first protrusions 2111 along an extending direction of the mating portions 221, and the first protrusions 2111 pass through the second slits 3112. At this time, the second slots 321 are located above the second protrusions 2130. The second slots 321 and the second protrusions 2130 are in alignment with each other in a vertical direction. Then, the spacer 3 is moved downwardly along an extending direction of the tail portions 222, so that the first constriction portions 2113 are tightly clamped in the first slits 3111. At the same time, the second protrusions 2130 are positioned in the second slots 321. The second constriction portions 2114 of the third protrusions 2112 are tightly clamped in the slits 341 so as to achieve multiple fixation and improve reliability. With this arrangement, all the plug terminal modules 2 can be combined into a whole by the spacer 3 in order to prevent loosening. In addition, the plug terminal modules 2 can be prevented from being separated from the spacer 3 along the extending direction of the mating portions 221. At the same time, distances between the plug terminal modules 2 can be effectively controlled. Through the mating of the second protrusions 2130 and the second slots 321, the retaining piece 3 can be prevented from falling off by an external force in a horizontal direction, thereby the structural reliability of the plug connector 100 is improved.

Referring to FIGS. 18 and 19, the mounting block 4 includes a plurality of through holes 41 for allowing the tail portions 222 of the plug conductive terminals 22 to pass through. Preferably, the mounting block 4 is made of electroplated plastic in order to further improve the shielding effect.

Figure 20:
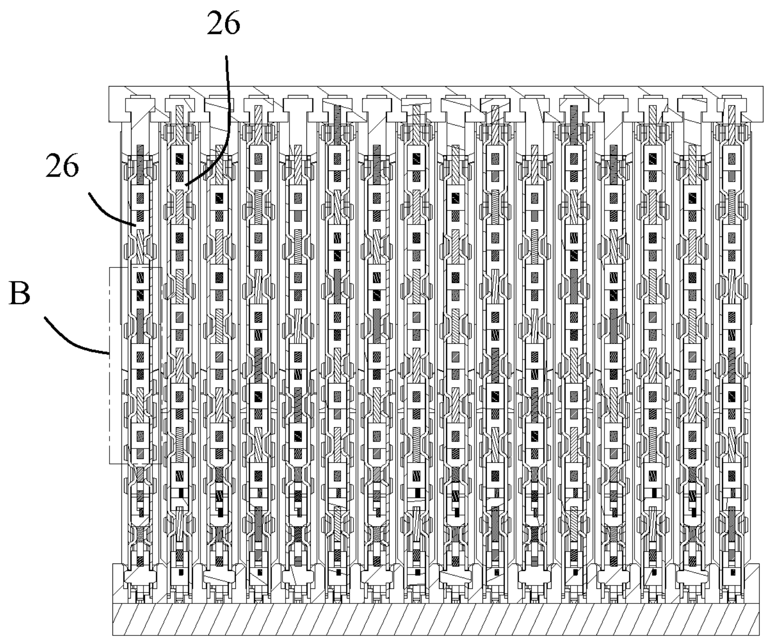
FIG. 20 is a schematic cross-sectional view taken along line A-A in FIG. 17.
Figure 23:
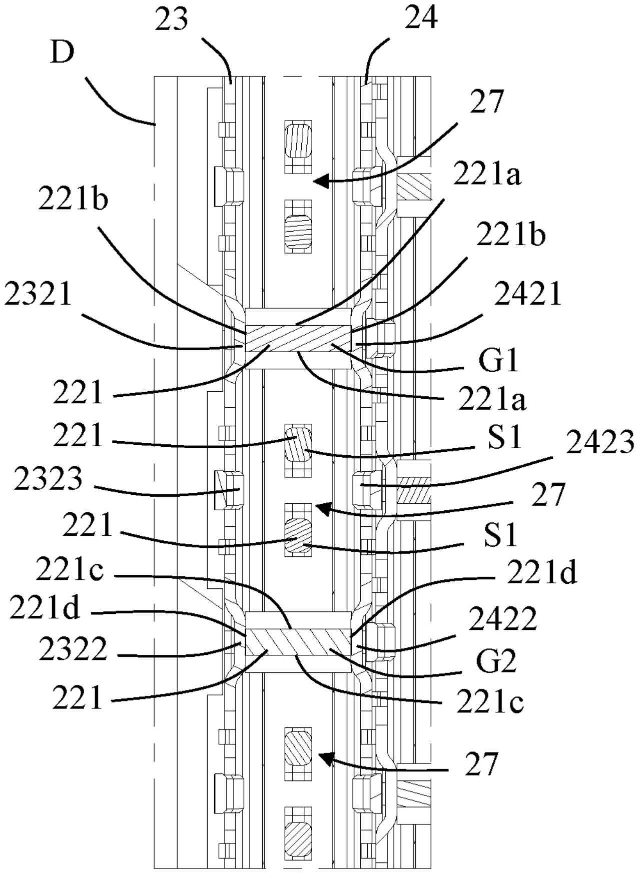
FIG. 23 is a partial enlarged view of a frame part D in FIG. 22.

Referring to FIGS. 20 and 23, in the illustrated embodiment of the present disclosure, the mating portion 221 and the first connection portion 223 of the first ground terminal G1 have a first wide surface 221*a* and a first narrow surface 221*b* perpendicular to the first wide surface 221*a*. The mating portion 221 and the first connection portion 223 of the second ground terminal G2 have a second wide surface 221*c* and a second narrow surface 221*d* perpendicular to the second wide surface 221*c*. The first connection portions 223 of each pair of first differential signal terminals are located between the first narrow surface 221*b* of the first ground terminal G1 and the second narrow surface 221*d* of the second ground terminal G2 which are located on opposite sides of the first connection portions 223 of each pair of first differential signal terminals. The mating portions 221 of each pair of first differential signal terminals are located between the first wide surface 221*a* of the first ground terminal G1 and the second wide surface 221*c* of the second ground terminal G2 which are located on opposite sides of the mating portions 221 of each pair of first differential signal terminals. In the illustrated embodiment of the present disclosure, a width of the first wide surface 221*a* and a width of the second wide surface 221*c* are greater than a width of each mating portion 221 of the first signal terminals S1, thereby better shielding can be provided for the mating portions 221 of the first signal terminals S1.

Figure 24:
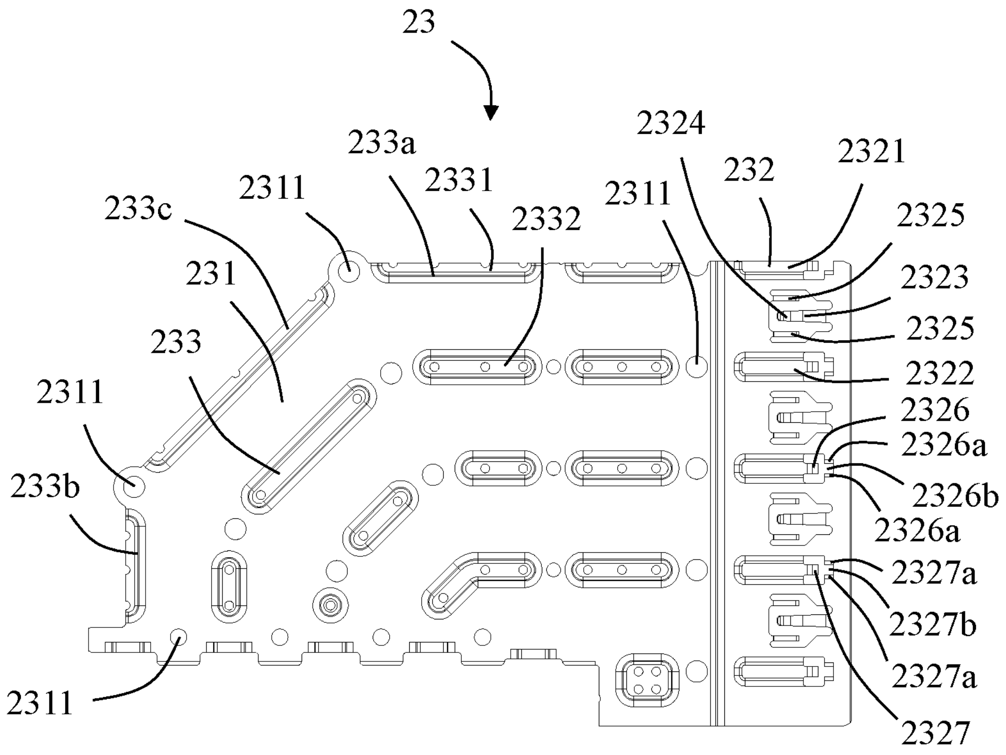
FIG. 24 is a side view of a first metal shield of the plug connector.

In the illustrated embodiment of the present disclosure, the first metal shield 23 and the second metal shield 24 are symmetrically disposed on opposite sides of the first insulating bracket 21. Referring to FIG. 24, the first metal shield 23 includes a first main body portion 231 and a first extension portion 232 extending from the first main body portion 231. The first main body portion 231 is located on one side of the first connection portions 223 of the first plug conductive terminals 22. The first extension portion 232 is located on one side of the mating portions 221 of the first plug conductive terminals 22. In the illustrated embodiment of the present disclosure, the first extension portion 232 and the first main body portion 231 are located in different planes, in which the first extension portion 232 is farther away from the second metal shield 24 than the first main body portion 231. The first main body portion 231 includes a plurality of first mounting holes 2311 for mating with the plurality of first posts 2161. The first posts 2161 are fixed and positioned in the first mounting holes 2311 by soldering, thereby the fixing and positioning of the first metal shield 23 and the first insulating bracket 21 are realized. The first main body portion 231 includes a plurality of ribs 233. The ribs 233 include a plurality of first ribs 2331 protruding toward the first ground terminals G1 and a plurality of second ribs 2332 protruding toward the second ground terminals G2. The first ribs 2331 corresponding to the first ground terminal G1 are disposed along an extending direction of the first connection portion 223 of the first ground terminal G1. The second ribs 2332 corresponding to the second ground terminal G2 are disposed along an extending direction of the first connection portion 223 of the second ground terminal G2. In the illustrated embodiment of the present disclosure, the first ribs 2331 and the second ribs 2332 are formed by stamping the first main body portion 231. The first ribs 2331 and the second ribs 2332 protrude toward the second metal shield 24. The first ribs 2331 and the second ribs 2332 are discontinuously disposed along the extending direction of the first connection portion 223 of the first ground terminal G1 and the extending direction of the first connection portion 223 of the second ground terminal G2, respectively, so as to achieve multi-position contact. In order to improve the reliability of the contact between the first metal shield 23 and the first ground terminals G1 and the second ground terminals G2, in the illustrated embodiment of the present disclosure, referring to FIG. 21, a wall thickness of the first rib 2331, a wall thickness of the second rib 2332, and a wall thickness of a portion of the first main body portion 231 located between the first rib 2331 and the second rib 2332 are the same. Specifically, each of the first ribs 2331 and the second ribs 2332 includes a first rib section 233*a* parallel to the mating portion 221, a second rib section 233*b* parallel to the tail portion 222, and a third rib section 233*c* connecting the first rib section 233*a* and the second rib section 233*b*. Referring to FIG. 20, the first rib section 233*a* extends horizontally, the second rib section 233*b* extends vertically, and the third rib section 233*c* extends obliquely. The first rib section 233*a*, the second rib section 233*b* and the third rib section 233*c* are in contact with the first section 223*a*, the second section 223*b* and the third section 223*c* of the first ground terminal G1 and the second ground terminal G2, respectively.

The first extension portion 232 includes a plurality of first bulges 2321 protruding toward the corresponding mating portions 221 of the first ground terminals G1, a plurality of second bulges 2322 protruding toward the corresponding mating portions 221 of the second ground terminals G2, and a plurality of first elastic pieces 2323 each of which is located between adjacent first bulge 2321 and second bulge 2322. The first elastic pieces 2323 extend along directions toward the first main body portion 231. Each first elastic piece 2323 has an arc-shaped contact portion 2324. In the illustrated embodiment of the present disclosure, the first extension portion 232 further includes two first protruding tabs 2325 located at opposite sides of each first elastic piece 2323. The first protruding tabs 2325 and the first elastic pieces 2323 extend along opposite directions. The first protruding tabs 2325 protrude sidewardly to contact the second metal shield 24 of the adjacent plug terminal module 2 so as to improve the shielding effect. In the illustrated embodiment of the present disclosure, referring to FIG. 23, a wall thickness of the first bulge 2321, a wall thickness of the second bulge 2322 and a wall thickness of a portion of the first extension portion 232 located between the first bulge 2321 and the second bulge 2322 are the same.

Figure 25:
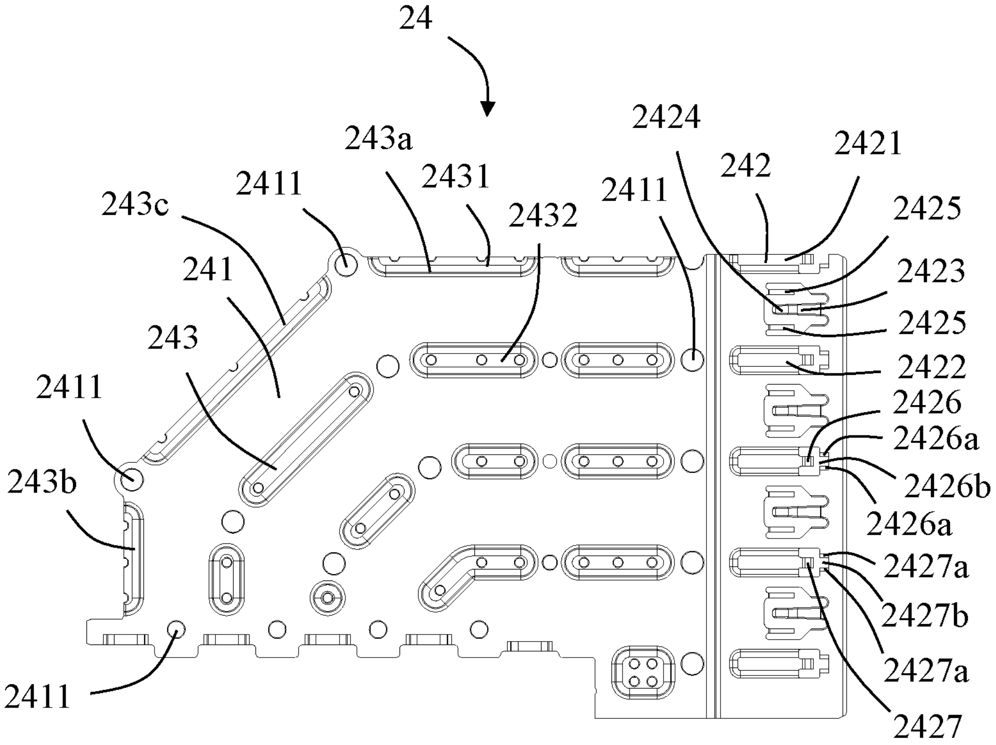
FIG. 25 is a side view of a second metal shield of the plug connector.
Figure 26:
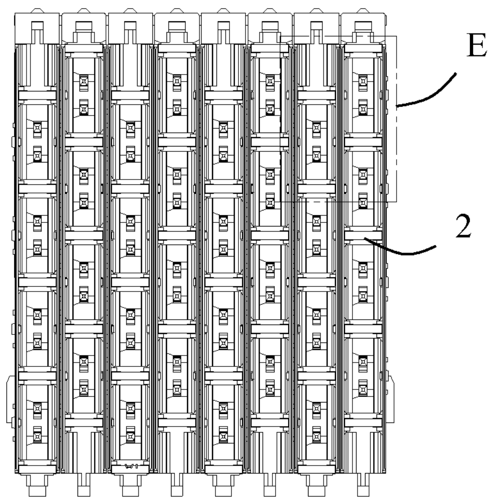
FIG. 26 is a front view of the plug terminal module in FIG. 11.
Figure 27:
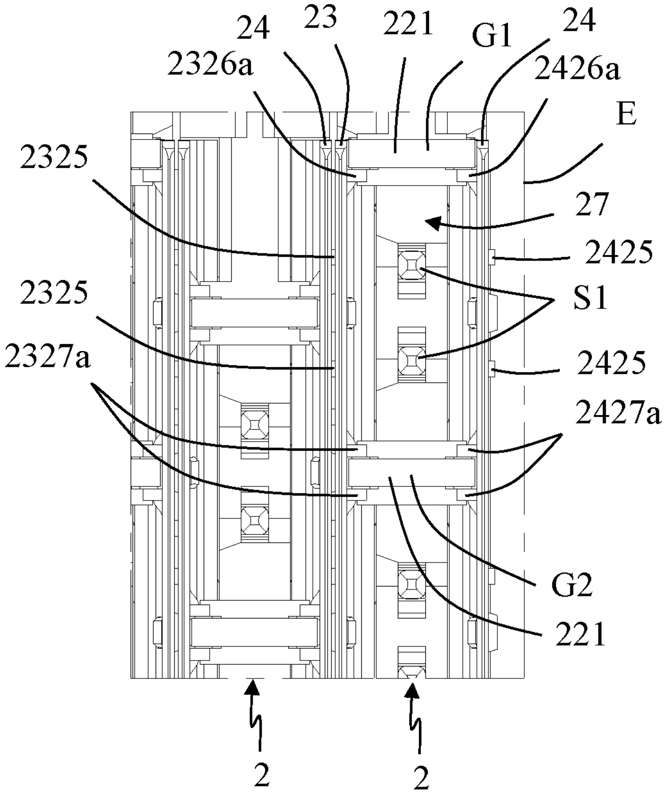
FIG. 27 is a partial enlarged view of a frame part E in FIG. 26.
Figure 28:
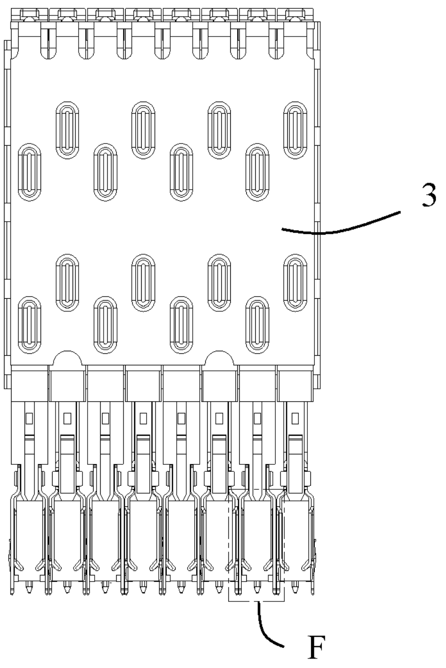
FIG. 28 is a top view of the plug terminal module in FIG. 11.
Figure 29:
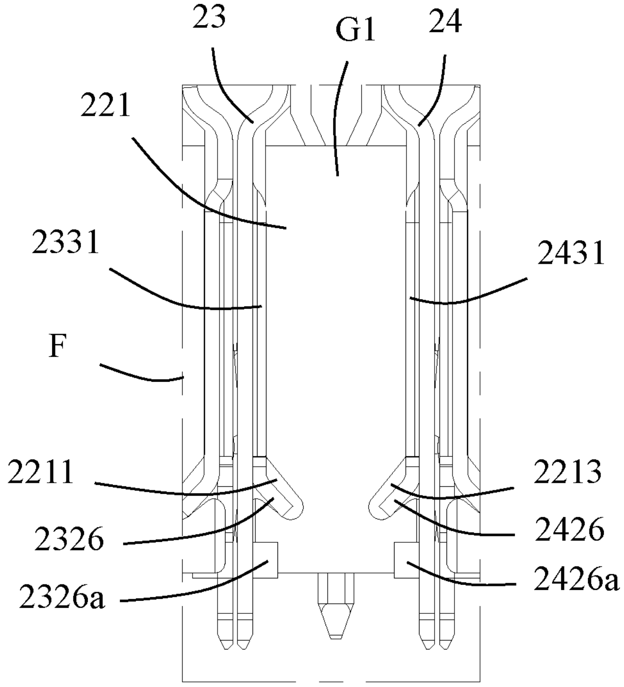
FIG. 29 is a partial enlarged view of a frame part F in FIG. 28.
Figure 30:
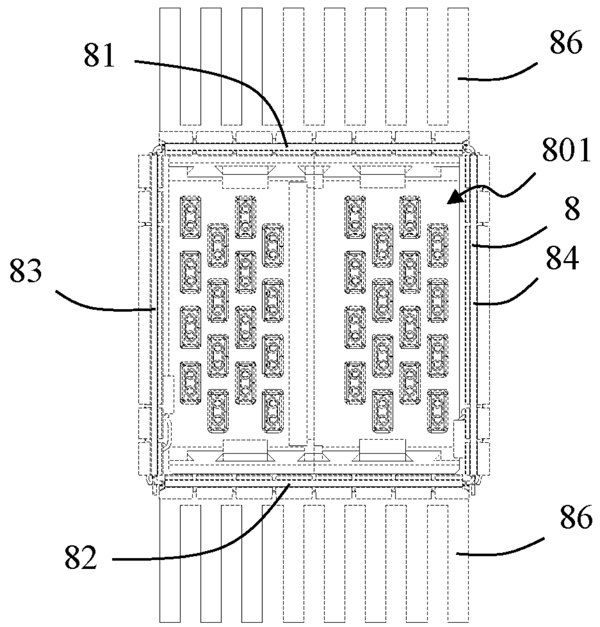
FIG. 30 is a front view of the receptacle connector assembly in FIG. 3.
Figure 31:
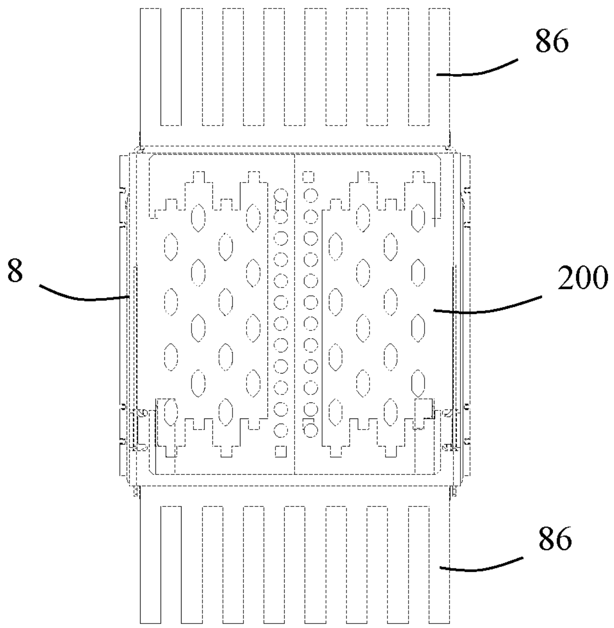
FIG. 31 is a rear view of FIG. 30.
Figure 32:
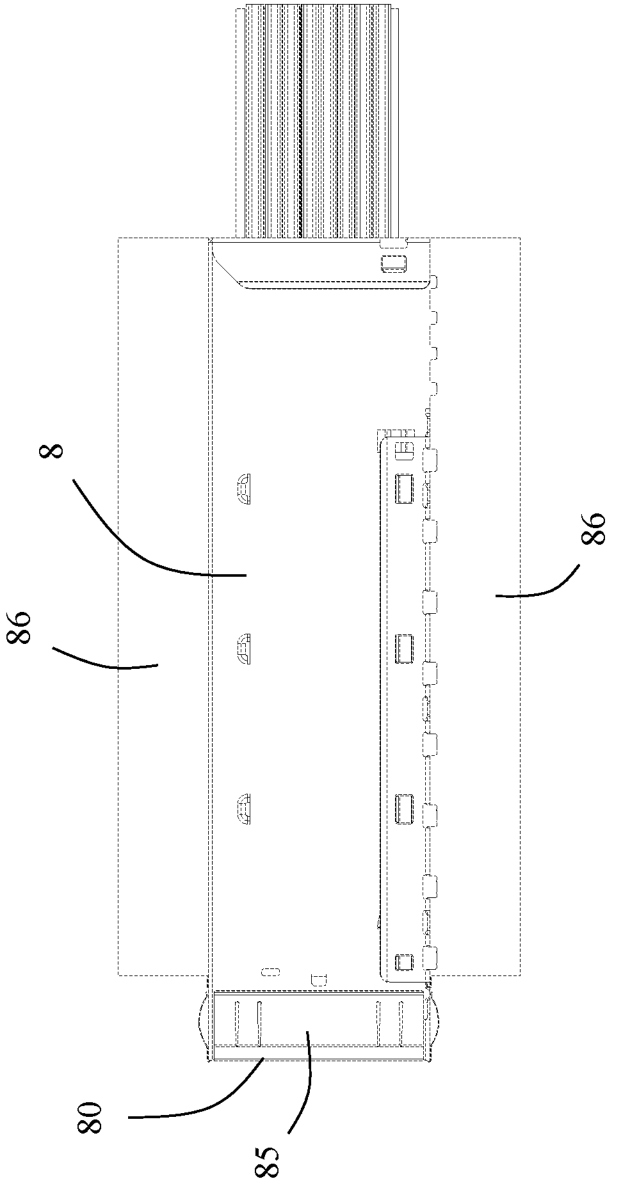
FIG. 32 is a right side view of the receptacle connector assembly in FIG. 3.
Figure 33:
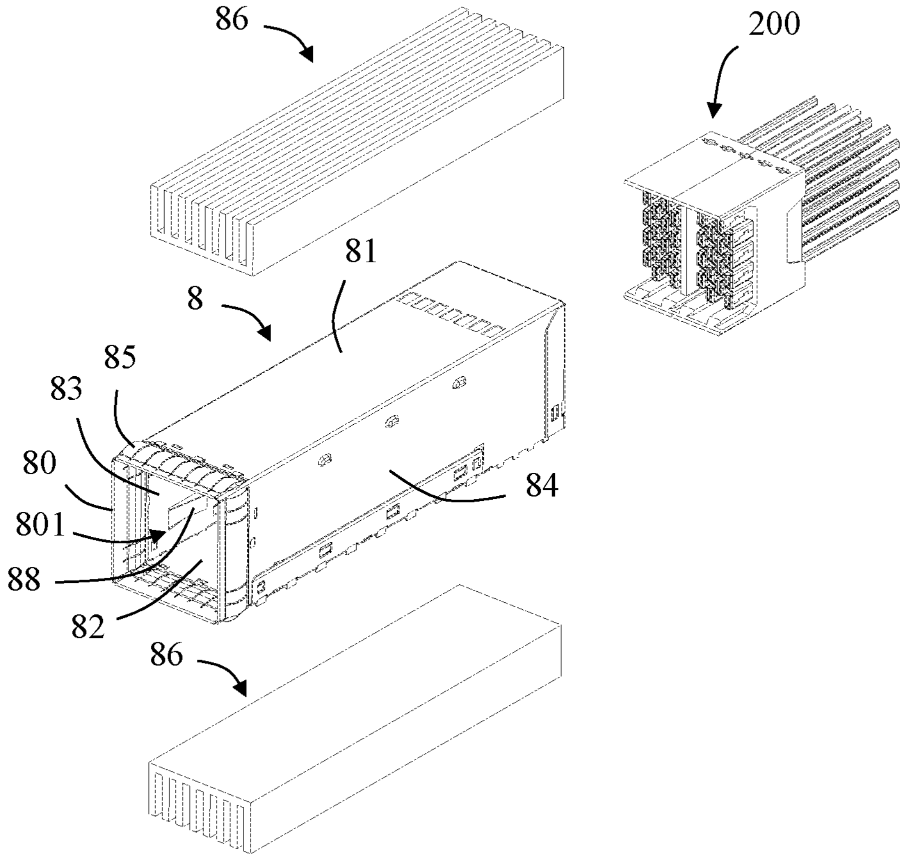
FIG. 33 is a partially exploded perspective view of the receptacle connector assembly in FIG. 3.
Figure 34:
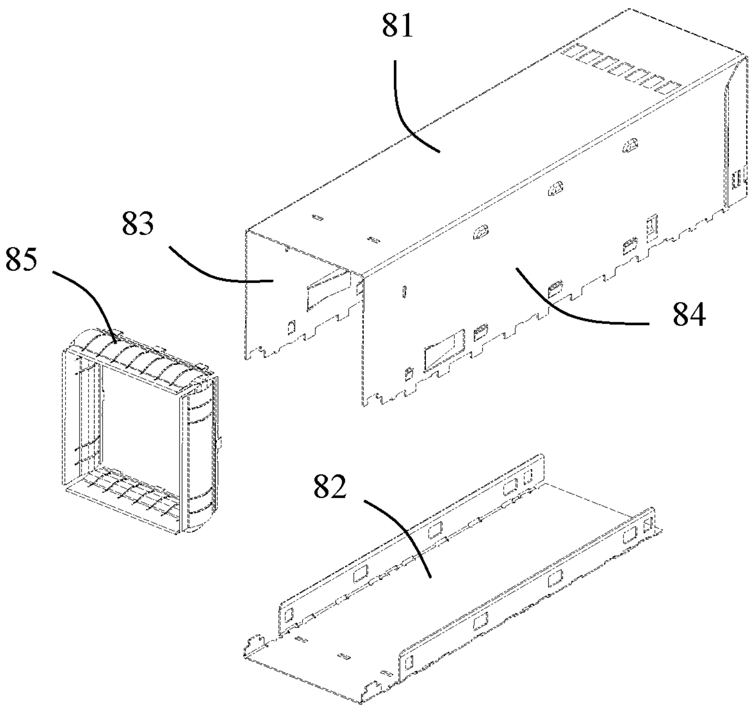
FIG. 34 is a perspective exploded view of a metal cage in FIG. 33.
Figure 35:
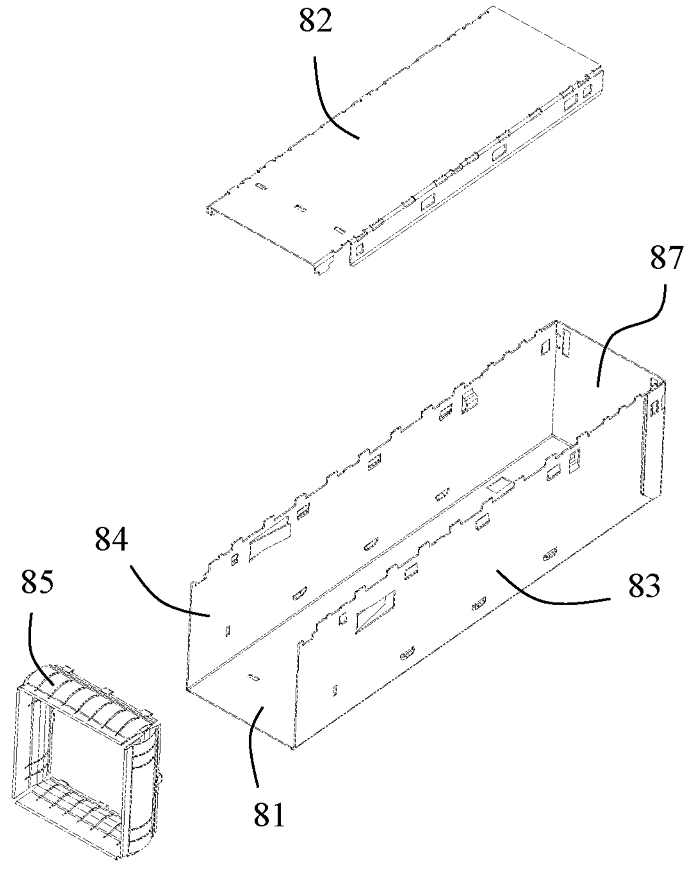
FIG. 35 is a perspective exploded view of FIG. 34 from another angle.

Similarly, referring to FIG. 25, the second metal shield 24 includes a second main body portion 241 and a second extension portion 242 extending from the second main body portion 241. The second main body portion 241 is located on the other side of the first connection portions 223 of the plug conductive terminals 22. The second extension portion 242 is located on the other side of the mating portions 221 of the plug conductive terminals 22. In the illustrated embodiment of the present disclosure, the second extension portion 242 and the second main body portion 241 are located in different planes, in which the second extension portion 242 is farther away from the first metal shield 23 than the second main body portion 241. The second main body portion 241 includes a plurality of second mounting holes 2411 for mating with the plurality of second posts 2162. The second posts 2162 are fixed and positioned in the second mounting holes 2411 by soldering, so as to realize the fixing and positioning of the second metal shield 24 and the first insulating bracket 21. The second main body portion 241 includes a plurality of ribs 243. The ribs 243 include a plurality of third ribs 2431 protruding toward the first ground terminals G1 and a plurality of fourth ribs 2432 protruding toward the second ground terminals G2. The third ribs 2431 are disposed along the extending direction of the first connection portion 223 of the first ground terminal G1. The fourth ribs 2432 are disposed along the extending direction of the first connection portion 223 of the second ground terminal G2. In the illustrated embodiment of the present disclosure, the third ribs 2431 and the fourth ribs 2432 are formed by stamping the second main body portion 241. The third ribs 2431 and the fourth ribs 2432 protrude toward the first metal shield 23. The third ribs 2431 and the fourth ribs 2432 are discontinuously disposed along the extending direction of the first connection portion 223 of the first ground terminal G1 and the extending direction of the first connection portion 223 of the second ground terminal G2, respectively, so as to achieve multi-position contact. As a result, the reliability of the contact between the second metal shield 24 and the first ground terminals G1 and the second ground terminals G2 is improved. In the illustrated embodiment of the present disclosure, a wall thickness of the third rib 2431, a wall thickness of the fourth rib 2432 and a wall thickness of a portion of the second main body portion 241 located between the third rib 2431 and the fourth rib 2432 are the same. Specifically, each of the third rib 2431 and the fourth rib 2432 includes a first rib section 243*a* parallel to the mating portion 221, a second rib section 243*b* parallel to the tail portion 222, a third rib section 243*c* connecting the first rib section 243*a* and the second rib section 243*b*. Referring to FIG. 25, the first rib section 243*a* extends horizontally, the second rib section 243*b* extends vertically, and the third rib section 243*c* extends obliquely. The first rib section 243*a*, the second rib section 243*b* and the third rib section 243*c* are in contact with the first section 223*a*, the second section 223*b* and the third section 223*c* of the first ground terminal G1 and the second ground terminal G2, respectively. In an embodiment of the present disclosure, soldering is performed on the surfaces of the ribs 233 and the ribs 243 to solder the ribs 233 and the ribs 243 to the first ground terminals G1 and the second ground terminals G2. I.e., soldering is performed on the surfaces of the first ribs 2331, the second ribs 2332, the third ribs 2431 and the fourth ribs 2432 in order to solder the first ribs 2331, the second ribs 2332, the third ribs 2431 and the fourth rib 2432 to the first ground terminals G1 and the second ground terminals G2. The soldering method is at least one of spot soldering, laser soldering and ultrasonic soldering. Preferably, the first rib 2331, the second rib 2332, the third rib 2431 and the fourth rib 2432 include through holes to expose the corresponding first ground terminal G1 and the corresponding second ground terminal G2, thereby facilitating soldering.

The second extension portion 242 includes a plurality of third bulges 2421 protruding toward the mating portions 221 of the first ground terminals G1, a plurality of fourth bulges 2422 protruding toward the mating portions 221 of the second ground terminals G2, and a plurality of second elastic pieces 2423 each of which is located between adjacent third bulge 2421 and fourth bulge 2422. The second elastic pieces 2423 extend along directions toward the second main body portion 241. Each second elastic piece 2423 has an arc-shaped contact portion 2424. In the illustrated embodiment of the present disclosure, the second extension portion 242 further includes two second protruding tabs 2425 located at opposite sides of each second elastic piece 2423. The second protruding tabs 2425 and the second elastic pieces 2423 extend along opposite directions. The second protruding tabs 2425 protrude sidewardly to contact the first metal shield 23 of the adjacent plug terminal module 2 so as to improve the shielding effect. In the illustrated embodiment of the present disclosure, a wall thickness of the third bulge 2421, a wall thickness of the fourth bulge 2422, and a wall thickness of a portion of the second extension portion 242 located between the third bulge 2421 and the fourth bulge 2422 are the same.

Figure 21:
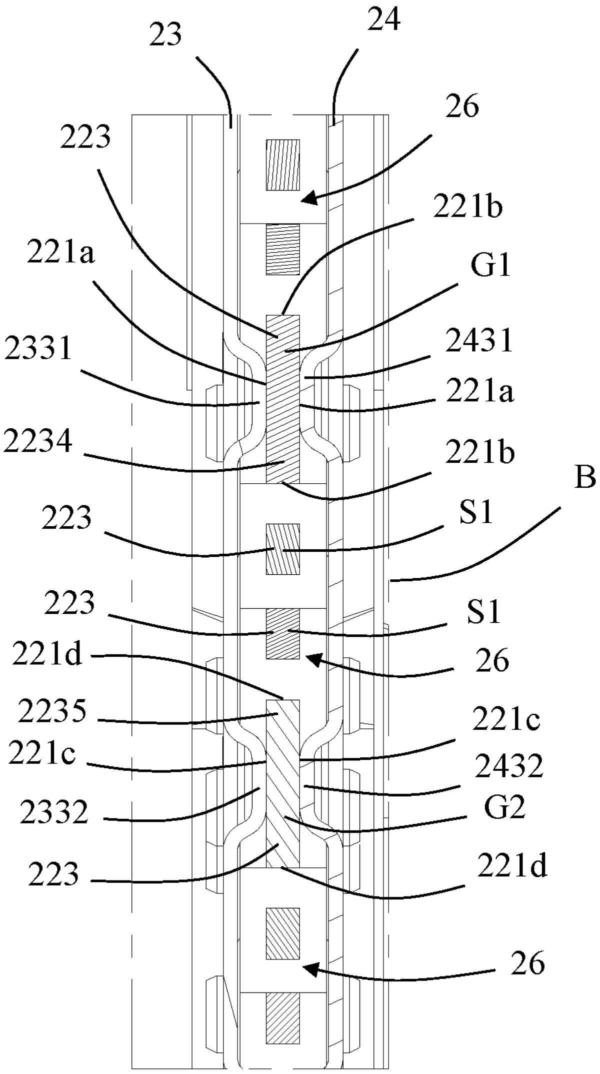
FIG. 21 is a partial enlarged view of a frame part B in FIG. 20.

Referring to FIG. 21, along a length of the first connection portion 223 of the plug conductive terminal 22, the first rib 2331 of the first metal shield 23 and the third rib 2431 of the second metal shield 24 respectively contact two opposite sides of the first connection portion 223 of the first ground terminal G1, and the second rib 2332 of the first metal shield 23 and the fourth rib 2432 of the second metal shield 24 respectively contact two opposite sides of the first connection portion 223 of the second ground terminal G2, thereby forming the shielding cavity 26 surrounding the outer periphery of the first connection portions 223 of each pair of first differential signal terminals. In the illustrated embodiment of the present disclosure, the first rib 2331 and the third rib 2431 respectively contact the first wide surface 221*a* of the first connection portion 223 of the first ground terminal G1. The second rib 2332 and the fourth rib 2432 respectively contact the second wide surface 221*c* of the first connection portion 223 of the second ground terminal G2. In the illustrated embodiment of the present disclosure, the shielding cavity 26 is jointly formed by the first main body portion 231, the second main body portion 241, the first ground terminal G1 and the second ground terminal G2. The first connection portion 223 of the first ground terminal G1 includes a first tab portion 2234 protruding into the shielding cavity 26. The first connection portion 223 of the second ground terminal G2 includes a second tab portion 2235 protruding into the shielding cavity 26. The first connection portions 223 of the first differential signal terminals are located between the first tab portion 2234 and the second tab portion 2235. In the illustrated embodiment of the present disclosure, there are a plurality of the shielding cavities 26 which are disposed along an arrangement direction of each group of the plug conductive terminals 22. Two adjacent shielding cavities 26 share a single first ground terminal G1 or a single second ground terminal G2. In addition, a part of the shared first ground terminal G1 protrudes into one shielding cavity 26, and another part of the shared first ground terminal G1 protrudes into another shielding cavity 26.

Referring to FIG. 23, in the length of the mating portion 221 of the plug conductive terminal 22, the first bulge 2321 of the first metal shield 23 and the third bulge 2421 of the second metal shield 24 respectively contact two opposite side surfaces of the mating portion 221 of the first ground terminal G1, and the second bulge 2322 of the first metal shield 23 and the fourth bulge 2422 of the second metal shield 24 respectively contact two opposite side surfaces of the mating portion 221 of the second ground terminal G2. In the illustrated embodiment of the present disclosure, the first bulge 2321 of the first metal shield 23 and the third bulge 2421 of the second metal shield 24 respectively contact the first narrow surfaces 221*b* of the mating portion 221 of the first ground terminal G1. The second bulge 2322 of the first metal shield 23 and the fourth bulge 2422 of the second metal shield 24 respectively contact the second narrow surfaces 221*d* of the mating portion 221 of the second ground terminal G2. The first extension portion 232, the second extension portion 242, the first ground terminal G1 and the second ground terminal G2 jointly form a shielding space 27 for accommodating the corresponding mating portions 221 of the first differential signal terminals. The first elastic piece 2323 and the second elastic piece 2423 extend into the shielding space 27. In the illustrated embodiment of the present disclosure, there are multiple shielding spaces 27 which are disposed along a stacking direction of each group of the plug conductive terminals 22. Two adjacent shielding spaces 27 share a single first ground terminal G1 or a single second ground terminal G2. One first wide surface 221*a* of the mating portion 221 of the shared first ground terminal G1 is exposed to the shielding space 27, and the other first wide surface 221*a* of the mating portion 221 of the shared first ground terminal G1 is exposed to an adjacent shielding space 27. Similarly, a first wide surface 221*c* of the mating portion 221 of the shared second ground terminal G2 is exposed to the adjacent shielding space 27, and the other wide surface 221*c* of the mating portion 221 of the shared second ground terminal G2 is exposed to another adjacent shielding space 27. The first protruding tabs 2325 and the second protruding tabs 2425 are inclined in a direction away from the shielding space 27 to facilitate contact with the adjacent plug terminal modules 2.

Figure 22:
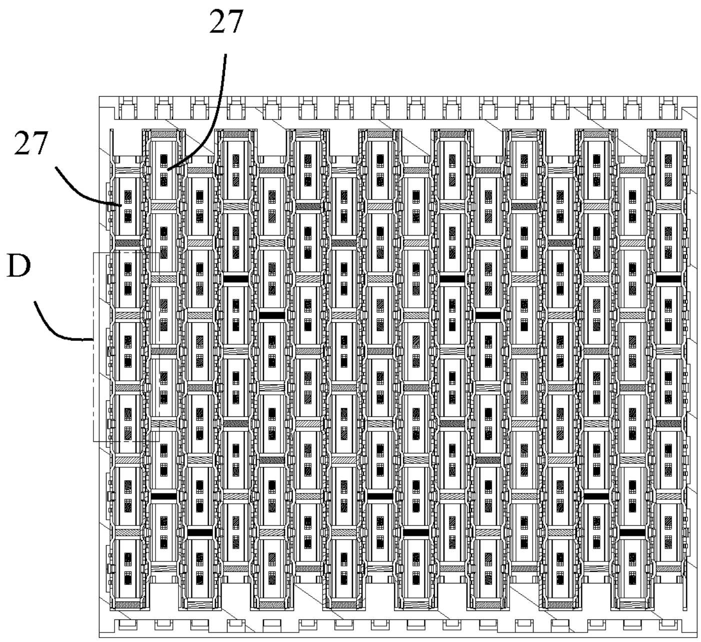
FIG. 22 is a schematic cross-sectional view taken along line C-C in FIG. 17.

In the illustrated embodiment of the present disclosure, there are multiple first plug terminal modules 2 of the plug connector 100, and the terminal arrangement of two adjacent plug terminal modules 2 are staggered. Correspondingly, the shielding cavities 26 at the same position of two adjacent plug terminal modules 2 are staggered (referring to FIG. 20), and the shielding spaces 27 at the same position of two adjacent plug terminal modules 2 are staggered (referring to FIG. 22).

The first extension portion 232 and/or the second extension portion 242 include limiting structures which restrict the mating portions 221 of the first ground terminal G1 and/or the mating portions 221 of the second ground terminal G2 in the front-rear direction and/or the top-bottom direction.

Specifically, as shown in FIGS. 14, 15, and 26 to 29, the mating portion 221 of the first ground terminal G1 includes a first limiting slot 2211 and a third limiting slot 2213 opposite to the first limiting slot 2211. The first limiting slot 2211 and the third limiting slot 2213 are symmetrically disposed on opposite sides of the mating portion 221 of the first ground terminal G1. The first limiting slot 2211 and the third limiting slot 2213 extend through the first narrow surfaces 221*b* of the first ground terminal G1, respectively. In the illustrated embodiment of the present disclosure, an angle between the first limiting slot 2211 and the front-rear direction, and an angle between the third limiting slot 2213 and the front-rear direction are approximately 45 degrees. Similarly, the mating portion 221 of the second ground terminal G2 includes a second limiting slot 2212 and a fourth limiting slot 2214 opposite to the second limiting slot 2212. The second limiting slot 2212 and the fourth limiting slot 2214 are symmetrically disposed on opposite sides of the mating portion 221 of the second ground terminal G2. The second limiting slot 2212 and the fourth limiting slot 2214 extend through the second narrow surfaces 221*d* of the second ground terminal G2, respectively. In the illustrated embodiment of the present disclosure, an angle between the second limiting slot 2212 and the front-rear direction, and an angle between the fourth limiting slot 2214 and the front-rear direction are approximately 45 degrees.

The first extension portion 232 includes a first limiting protrusion 2326 locked in the first limiting slot 2211 and a second limiting protrusion 2327 locked in the second limiting slot 2212. Each of the first limiting protrusion 2326 and the second limiting protrusion 2327 forms an angle of 45 degrees with respect to a vertical plane. Similarly, the second extension portion 242 includes a third limiting protrusion 2426 locked in the third limiting slot 2213 and a fourth limiting protrusion 2427 locked in the fourth limiting slot 2214. Each of the third limiting protrusion 2426 and the fourth limiting protrusion 2427 forms an angle of 45 degrees with respect to the vertical plane. The first limiting protrusion 2326 and the third limiting protrusion 2426 are symmetrically disposed on opposite sides of the mating portion 221 of the first ground terminal G1. The first limiting protrusion 2326 and the third limiting protrusion 2426 are adapted to restrict the mating portion 221 of the first ground terminal G1 in the front-rear direction to prevent it from moving backwardly. The second limiting protrusion 2327 and the fourth limiting protrusion 2427 are symmetrically disposed on opposite sides of the mating portion 221 of the second ground terminal G2. The second limiting protrusion 2327 and the fourth limiting protrusion 2427 are adapted to restrict the mating portion 221 of the second ground terminal G2 in the front-rear direction.

In the illustrated embodiment of the present disclosure, the first limiting protrusion 2326 is located at a front free end of the first bulge 2321 and is integrally stamped from the first bulge 2321. The second limiting protrusion 2327 is located at a front free end of the second bulge 2322 and is integrally stamped from the second bulge 2322. The third limiting protrusion 2426 is located at a front free end of the third bulge 2421 and is integrally stamped from the third bulge 2421. The fourth limiting protrusion 2427 is located at a front free end of the fourth bulge 2422 and is integrally stamped from the fourth bulge 2422.

In addition, the first extension portion 232 further includes two first clamping blocks 2326*a* and two second clamping blocks 2327*a*. The two first clamping blocks 2326*a* include a first clamping groove 2326*b* for restricting the mating portion 221 of the first ground terminal G1 in the vertical direction. The two second clamping blocks 2327*a* include a second clamping groove 2327*b* for restricting the mating portion 221 of the second ground terminal G2 in the vertical direction. Similarly, the second extension portion 242 further includes two third clamping blocks 2426*a* and two fourth clamping blocks 2427*a*. The two third clamping blocks 2426*a* include a third clamping groove 2426*b* for restricting the mating portion 221 of the first ground terminal G1 in the vertical direction. The two fourth clamping blocks 2427*a* include a fourth clamping groove 2427*b* for restricting the mating portion 221 of the second ground terminal G2 in the vertical direction.

Of course, in other embodiments, the first clamping block 2326*a*, the second clamping block 2327*a*, the third clamping block 2426*a* and the fourth clamping block 2427*a* can also be provided as one which is used to abut against the corresponding mating portions 221 of the first ground terminal G1 and the second ground terminal G2 in the vertical direction so as to achieve position restriction. In the illustrated embodiment of the present disclosure, the first clamping block 2326*a* is located at a front end of the first limiting protrusion 2326. The second clamping block 2327*a* is located at a front end of the second limiting protrusion 2327. The third clamping block 2426*a* is located at a front end of the third limiting protrusion 2426. The fourth clamping block 2427*a* is located at a front end of the fourth limiting protrusion 2427.

Referring to FIGS. 30 to 35, the receptacle connector assembly 400 includes a metal cage 8 and a receptacle connector 200 at least partially located in the metal cage 8. The metal cage 8 includes a second end surface 80 and a mating space 801 extending through the second end surface 80. The receptacle connector 200 is located at a rear end of the mating space 801 and communicates with the mating space 801. In an embodiment of the present disclosure, the receptacle connector 200 is a backplane connector.

The metal cage 8 includes a second top wall 81, a second bottom wall 82, a third side wall 83, a fourth side wall 84 and a rear wall 87. The mating space 801 is enclosed by the second top wall 81, the second bottom wall 82, the third side wall 83 and the fourth side wall 84. The third side wall 83 and the fourth side wall 84 are provided with abutting elastic arms 88 protruding into the mating space 801 to abut against the metal shell 5 of the plug connector 100. The receptacle connector assembly 400 also includes grounding elastic arms 85 fixed to the second top wall 81, the second bottom wall 82, the third side wall 83, and the fourth side wall 84, respectively. The grounding elastic arms 85 are disposed adjacent to the second end surface 80.

The receptacle connector assembly 400 further includes a receptacle heat sink 86 fixed to the second top wall 81 and/or the second bottom wall 82 to improve the heat dissipation effect.

Figure 36:
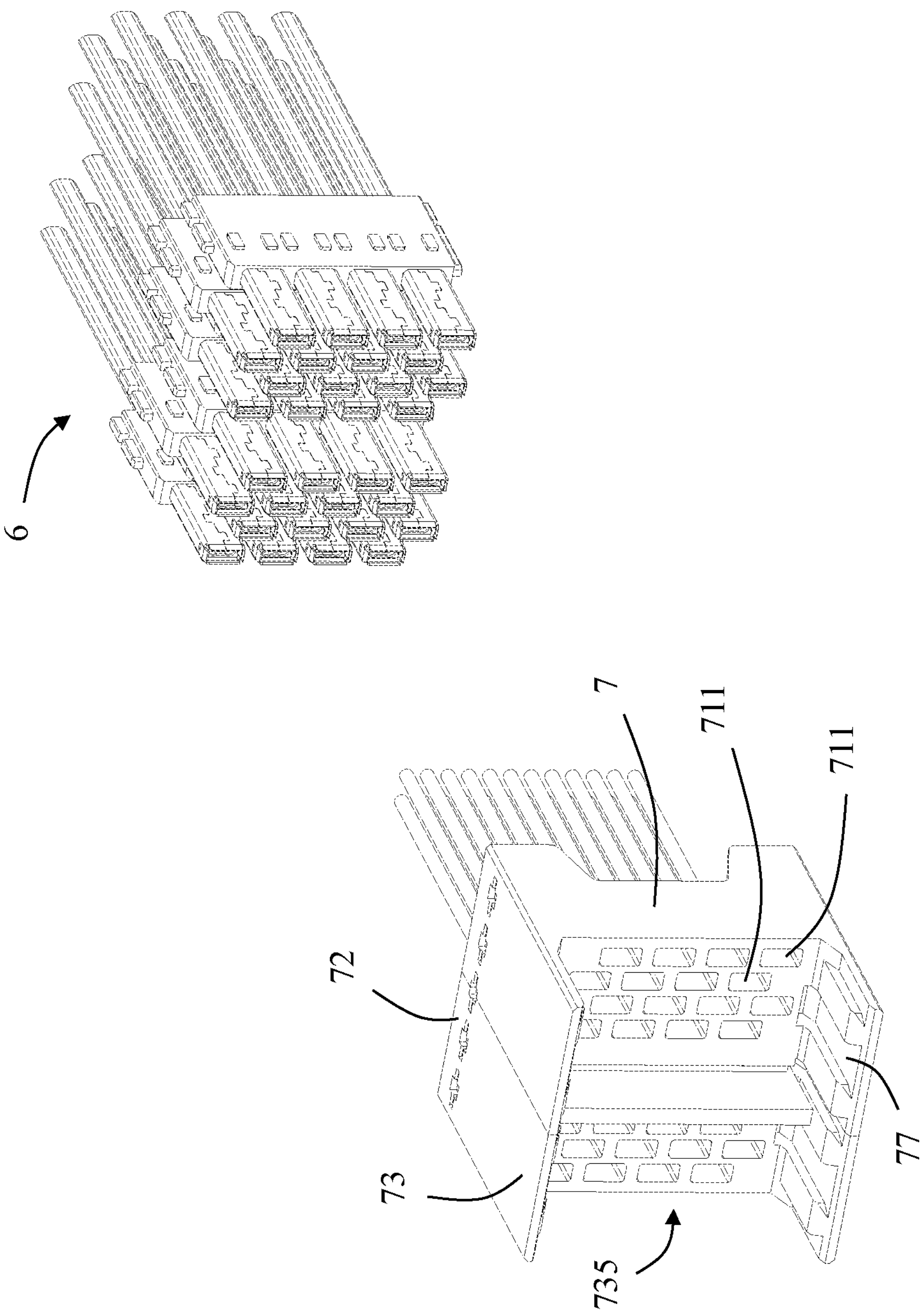
FIG. 36 is a partially exploded perspective view of a receptacle connector in FIG. 33.
Figure 37:
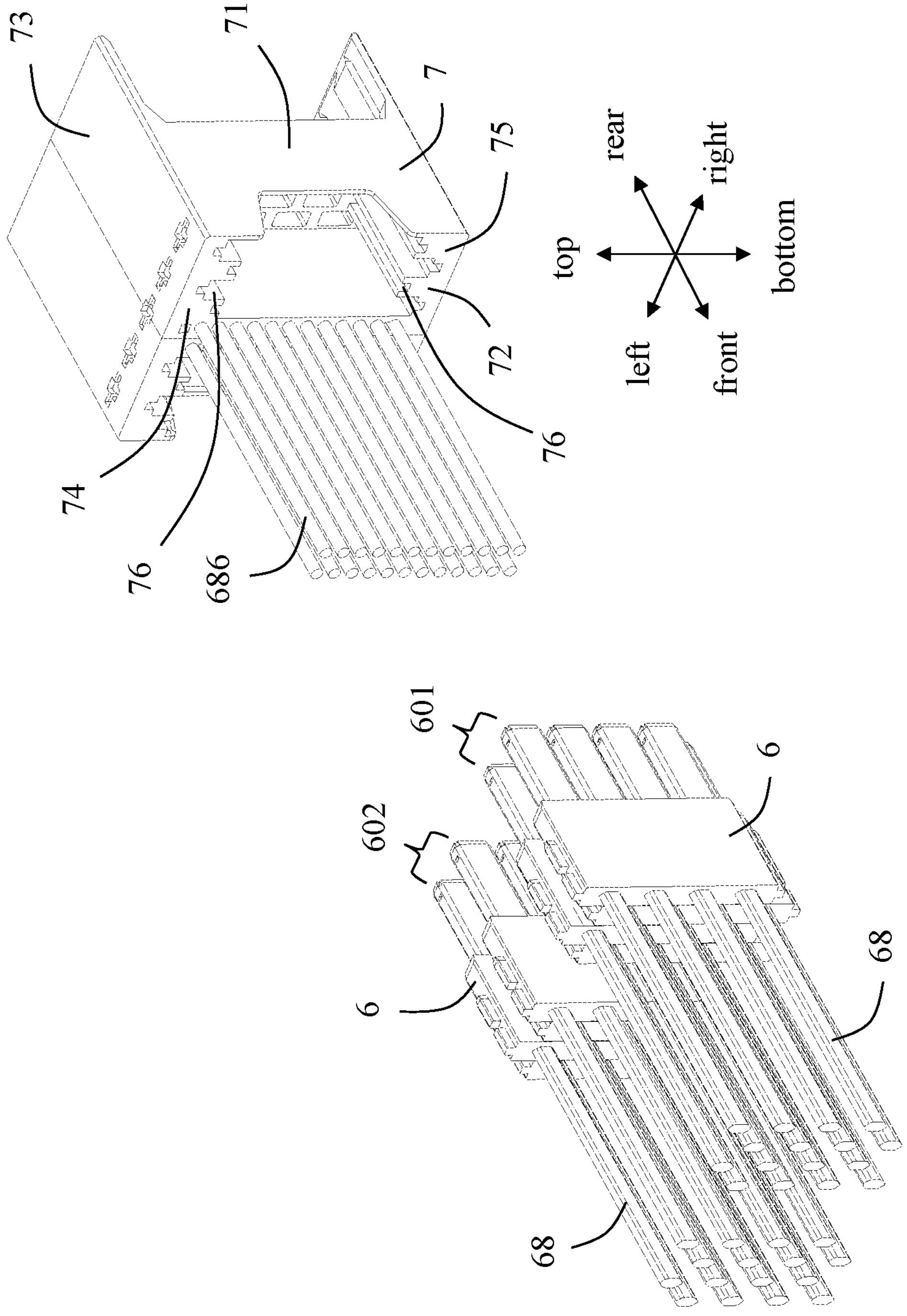
FIG. 37 is a partially exploded perspective view of FIG. 36 from another angle.
Figure 38:
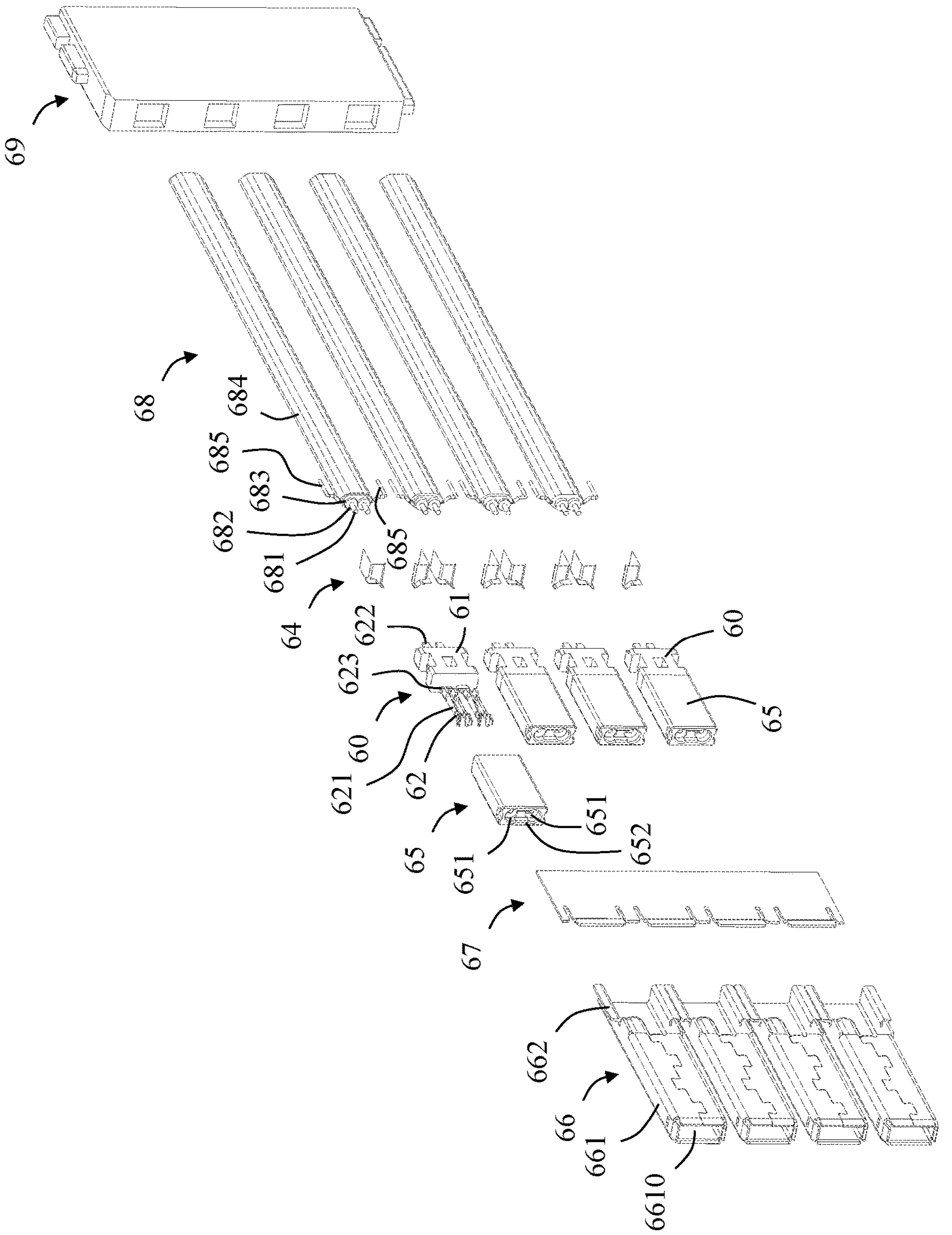
FIG. 38 is a partial perspective exploded view of a receptacle terminal module in FIG. 36.

Referring to FIGS. 36 to 38, the receptacle electrical connector 200 includes a receptacle housing 7 and a plurality of receptacle terminal modules 6 mounted to the receptacle housing 7. The reason why the plug connector 100 is such called is because it is a component of the plug connector assembly 300. The reason why the receptacle connector 200 is such called is because it is a component of the receptacle connector assembly 400. So, it does not necessarily mean that the plug connector 100 must have some unique features to be a plug connector, and it does not necessarily mean that the receptacle connector 200 must have some unique features to be a receptacle connector. It is understandable to those of ordinary skill in the art that the plug connector 100 and the receptacle electrical connector 200 are exchangeable. For example, when the receptacle connector 200 is applied in the plug connector assembly 300, it is then called a plug connector; and when the plug connector 100 is applied in the receptacle connector assembly 400, it is then called a receptacle connector.

The receptacle housing 7 is made of insulating material, and includes a body portion 71, a first extension wall 72 extending from the body portion 71 to one end, and a second extension wall 73 extending from the body portion 71 to the other end. The body portion 71 includes a plurality of terminal receiving grooves 711 extending along a front-rear direction. In the illustrated embodiment of the present disclosure, the terminal receiving grooves 711 are disposed in multiple rows along a left-right direction. Two adjacent rows of terminal receiving grooves 711 are staggered in a vertical direction. That is, the terminal receiving grooves 711 at corresponding positions in the two adjacent rows of terminal receiving grooves 711 are not aligned in the left-right direction. The first extension wall 72 includes a first extension wall portion 74 and a second extension wall portion 75 opposite to each other. The second extension wall 73 includes a receiving space 735 which is used for at least partially receiving the plug electrical connector 100. The first extension wall portion 74 and the second extension wall portion 75 are provided with a plurality of second installation slots 76 for installing the receptacle terminal modules 6. The first extension wall portion 74 and the second extension wall portion 75 further include positioning slots 77 for positioning the positioning protrusions 15.

Referring to FIG. 38, each receptacle terminal module 6 includes a plurality of insulating blocks 65, a plurality of terminal modules 60 mounted to the insulating blocks 65, a grounding element, a metal shielding plate 67 for cooperating with the grounding element, a plurality of receptacle cables 68 electrically connected to the terminal modules 60, and an outer covering portion 69 partially covering the terminal modules 60, the grounding element, the metal shielding plate 67 and the receptacle cables 68. In the illustrated embodiment of the present disclosure, the grounding element includes a plurality of metal shield surrounding members 66 sleeved on the insulating blocks 65 and the terminal modules 60. The receptacle cables 68 extend through the rear wall 87 of the metal cage 8. In some other embodiments, the receptacle terminal module 6 may not include receptacle cables 68. Under such condition, the receptacle electrical connector 200 is located at the rear of the mating space 801, but in front of the rear wall 87. It is understandable to those of ordinary skill in the art that the mating space 801 is configured to receive the plug connector 100 before the plug conductive terminals 22 of the plug connector 100 are electrically connected with receptacle conductive terminals 62 of the receptacle electrical connector 200.

The terminal module 60 includes an insulating member 61 and a plurality of receptacle conductive terminals 62 fixed to the insulating member 61. In an embodiment of the present disclosure, the receptacle conductive terminals 62 are insert-molded with the insulating member 61. Of course, in other embodiments, the receptacle conductive terminals 62 may also be fixed to the insulating member 61 by assembly. In a preferred embodiment of the present disclosure, each receptacle conductive terminal 62 is connected with a corresponding receptacle cable 68. In other words, none of the receptacle conductive terminals 62 is directly connected to a circuit board. Compared to transmit signals through the circuit board, by transmitting signals, especially differential signals, through cables, it is more beneficial to reduce signal distortion and improve signal transmitting quality.

From a structural point of view, each receptacle conductive terminal 62 includes a contact arm 621, an end portion 622, and a second connection portion 623 connecting the contact arm 621 and the end portion 622. The second connection portion 623 is fixed to the insulating member 61. The contact arm 621 extends forwardly and protrudes beyond the insulating member 61 so as to be electrically connected to the first signal terminal S1 of the plug connector 100. The end portion 622 extends backwardly and protrudes beyond the insulating member 61 to be electrically connected to the receptacle cable 68. In the illustrated embodiment of the present disclosure, each receptacle conductive terminal 62 is substantially in a shape of a straight bar and extends in the front-to-rear direction.

In an embodiment of the present disclosure, the receptacle conductive terminals 62 in each terminal module 60 form a pair of second differential signal terminals to increase the signal transmission rate. In other words, the plurality of receptacle conductive terminals 62 of each terminal module 60 include a first signal terminal and a second signal terminal. The first signal terminal and the second signal terminal form a differential pair and are fixed to the insulating member 61.

Each insulating block 65 is provided with two through holes 651 into which the contact arms 621 of the receptacle conductive terminals 62 are inserted, and a mating surface 652 at an end of the insulating block 65. The through holes 651 extend through the mating surface 652. In the illustrated embodiment of the present disclosure, the insulating block 65 has a substantially cuboid shape. Correspondingly, the metal shield surrounding member 66 has a substantially cuboid shape. In an embodiment of the present disclosure, the insulating block 65 is fixed in the metal shield surrounding member 66 by soldering. Of course, in other embodiments, the insulating block 65 may also be fixed in the metal shield surrounding member 66 in other ways, i.e., by mechanical fixation.

Referring to FIG. 38, the metal shield surrounding member 66 includes a cylindrical portion 661, an extended portion 662 connected to the cylindrical portion 661, and an abutting portion 663 connected to the extended portion 662. The cylindrical portion 661 is provided with a shielding cavity 6610 for accommodating the insulating block 65 and the terminal module 60 in order to improve the shielding effect. A cross section of the extended portion 662 is substantially U-shaped.

The metal shielding plate 67 is arranged opposite to the extended portion 662, and the metal shielding plate 67 is in contact with the metal shield surrounding member 66 so as to improve the grounding shielding effect.

Referring to FIG. 38, each receptacle cable 68 includes a core 681 electrically connected to the end portion 622 of the second differential signal terminal, an insulating layer 682 wrapped on the core 681, a shielding layer 683 wrapped on the insulating layer 682, an insulating outer layer 684 wrapped on part of the shielding layer 683, and a grounding wire 685 located between the shielding layer 683 and the insulating outer layer 684. In an embodiment of the present disclosure, the core 681 and the end portion 622 of the second differential signal terminal are fixed by soldering. In the illustrated embodiment of the present disclosure, the grounding wire 685 is bent and extends out of the insulating outer layer 684.

The metal shield surrounding member 66 surrounds a periphery of the second differential signal terminal to provide a better shielding effect on signal transmission. The metal shield surrounding member 66 is similar to the function of the first ground terminal G1 and the second ground terminal G2. The metal shield surrounding member 66 is equivalent to connect the first ground terminal G1 and the second ground terminal G2 and forms a cylindrical shape wrapped around the periphery of the second differential signal terminal to further improve the ground shielding effect. The receptacle terminal module 6 further includes a connecting piece 64 connecting the grounding wire 685 and the metal shield surrounding member 66 so as to improve the ground shielding effect.

In the illustrated embodiment of the present disclosure, there are a plurality of receptacle terminal modules 6 of the receptacle connector 200, and an arrangement of each two adjacent receptacle terminal modules 6 is staggered. When the receptacle terminal modules 6 are assembled to the receptacle housing 7, each metal shield surrounding member 66 of the receptacle terminal modules 6 passes through the corresponding terminal receiving groove 711 to extend into the receiving space 735.

Referring to FIG. 37, in the illustrated embodiment of the present disclosure, the plurality of receptacle terminal modules 6 include a first receptacle terminal module 601, a second receptacle terminal module 602, and at least one non-differential signal terminal (not shown) located between the first receptacle terminal module 601 and the second receptacle terminal module 602. The plurality of receptacle terminal modules 6 include a cable 686 electrically connected to the non-differential signal terminal. The at least one non-differential signal terminal is adapted to transmit control signals and/or power supplies.

In the illustrated embodiment of the present disclosure, each of the first receptacle terminal modules 601 and each of the second receptacle terminal modules 602 are respectively located in a vertical plane as a whole. For each of the first receptacle terminal modules 601 and each of the second receptacle terminal modules 602, a plurality of the metal shield surrounding members 66 and a plurality of pairs of the second differential signal terminals are stacked and separated by a certain distance in the vertical plane. The second differential signal terminals are divided into at least three pairs. Each pair of the second differential signal terminals is wrapped in the corresponding metal shield surrounding member 66. The number of the first receptacle terminal modules 601 and the second receptacle terminal modules 602 is at least five and they are arranged side by side. Any two adjacent first receptacle terminal modules 601 are arranged next to each other. That is, a mating end of each first receptacle terminal module 601 is close to the adjacent first receptacle terminal module 601. Any two adjacent second receptacle terminal modules 602 are arranged next to each other. That is, a mating end of each second receptacle terminal module 602 is close to the adjacent second receptacle terminal module 602. The first receptacle terminal modules 601 are spaced a certain distance with respect to the second receptacle terminal modules 602 along a left-right direction as a whole in order to install the non-differential signal terminal.

Figure 39:
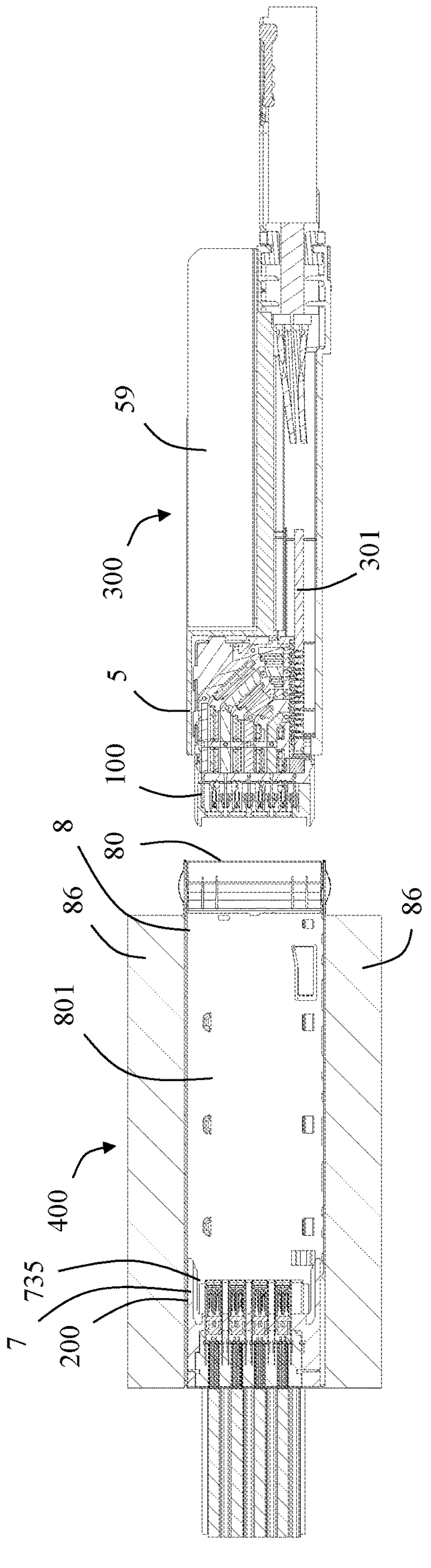
FIG. 39 is a schematic cross-sectional view taken along H-H in FIG. 3.

Referring to FIGS. 15, 38 and 39, when the plug connector assembly 300 is mated with the receptacle connector assembly 400, the plug connector assembly 300 is at least partially inserted into the mating space 801. The length of the metal cage 8 extending in the mating direction (i.e., the front-to-rear direction) is much greater than the length of the receptacle connector 200 after the receptacle cable 68 is removed. In this way, a relatively deep mating space 801 is formed at the front end of the receptacle connector 200, which is beneficial to improve the shielding effect. In addition, the length of the metal shell 5 extending in the mating direction (i.e., the front-to-rear direction) is much greater than the length of the plug connector 100 after the plug cable 302 is removed. In this way, it is beneficial to improve the shielding effect of the plug connector 100. By providing the metal cage 8 and the metal shell 5, the shielding effect of the connector assembly 500 of the present disclosure is improved, which is beneficial to improve the quality of signal transmission. When the plug connector assembly 300 is inserted in place, the plug housing 1 of the plug connector 100 is inserted into the receiving space 735 of the receptacle housing 7 of the receptacle connector 200. Moreover, at a rear end (a deep end) of the receiving space 735, the mating portion 221 of the plug terminal module 2 is inserted into the corresponding contact arm 621 of the receptacle terminal module 6 so as to achieve contact. By mating the plug connector 100 and the receptacle connector 200 at the rear end (the deep end) of the receiving space 735, the shielding effect of the metal shell 5 and the metal cage 8 at the front end can be fully utilized, thereby improving the quality of signal transmission. In addition, the present disclosure increases the speed of signal transmission by arranging multiple pairs of differential signal terminals.

The above embodiments are only used to illustrate the present disclosure and not to limit the technical solutions described in the present disclosure. The understanding of this specification should be based on those skilled in the art. Descriptions of directions, such as “front”, “back”, “left”, “right”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A first connector assembly, comprising:

a metal shell, the metal shell comprising a first end surface and an installation space extending through the first end surface; and a first connector, the first connector being at least partially received in the installation space, the first connector comprising a first housing and a plurality of first terminal modules, the plurality of first terminal modules being arranged side by side and assembled to the first housing;

wherein at least one first terminal module comprises a plurality of first conductive terminals, the plurality of first conductive terminals comprise a first differential signal terminal, a first ground terminal and a second ground terminal, and the first differential signal terminal is located between the first ground terminal and the second ground terminal;

wherein each first conductive terminal comprises a first connection portion and a mating portion, the at least one first terminal module further comprises:

an insulating bracket, the insulating bracket being fixed on the first connection portion, the mating portion protruding beyond the insulating bracket;

a first metal shield, the first metal shield being located on one side of the insulating bracket; and a second metal shield, the second metal shield being located on the other side of the insulating bracket.

2. The first connector assembly according to claim 1, wherein the metal shell comprises a first top wall, a first bottom wall, a first side wall, and a second side wall; and wherein the installation space is enclosed by the first top wall, the first bottom wall, the first side wall and the second side wall.

3. The first connector assembly according to claim 2, wherein the metal shell comprises a first metal shell and a second metal shell assembled together; the first metal shell comprises the first top wall, a first side wall portion extending from a first side of the first top wall, and a second side wall portion extending from a second side of the first top wall; the second metal shell comprises the first bottom wall, a third side wall portion extending from a first side of the first bottom wall, and a fourth side wall portion extending from a second side of the first bottom wall; the first side wall comprises the first side wall portion and the third side wall portion; and the second side wall comprises the second side wall portion and the fourth side wall portion.

4. The first connector assembly according to claim 3, wherein the first metal shell comprises an opening located between the first side wall portion and the second side wall portion; and wherein the metal shell comprises a first heat sink installed in the opening, and the first heat sink comprises a plurality of heat dissipation channels arranged at intervals.

5. The first connector assembly according to claim 1, further comprising a first cable which is electrically connected to the plurality of first conductive terminals, directly or indirectly.

6. The first connector assembly according to claim 5, further comprising a built-in circuit board, the plurality of first conductive terminals being electrically connected to the built-in circuit board, the first cable being electrically connected to the plurality of first conductive terminals through the built-in circuit board.

7. The first connector assembly according to claim 5, further comprising an unlocking assembly mounted on the metal shell and a pull strap connected to the unlocking assembly; wherein the unlocking assembly is slidable driven by the pull strap.

8. The first connector assembly according to claim 1, wherein the first metal shield comprises a first extension portion, the second metal shield comprises a second extension portion, the first extension portion, the second extension portion, the mating portion of the first ground terminal, and the mating portion of the second ground terminal are enclosed to form a shielding space, and the mating portion of the first differential signal terminal is located in the shielding space.

9. The first connector assembly according to claim 8, wherein the first extension portion comprises a first bulge protruding toward the first ground terminal and a second bulge protruding toward the second ground terminal;

wherein the second extension portion comprises a third bulge protruding toward the first ground terminal and a fourth bulge protruding toward the second ground terminal; and wherein the first bulge and the third bulge are in contact with opposite side surfaces of the contact portion of the first ground terminal, respectively; the second bulge and the fourth bulge are in contact with opposite side surfaces of the contact portion of the second ground terminal, respectively; and the first extension portion, the second extension portion, the first ground terminal and the second ground terminal are jointly enclosed to form the shielding space.

10. The first connector assembly according to claim 1, wherein the first metal shield comprises a first main body portion located on one side of the first connection portions of the first conductive terminals, the first main body portion comprises a first rib protruding toward the first ground terminal and a second rib protruding toward the second ground terminal;

wherein the second metal shield comprises a second main body portion located on the other side of the first connection portions of the first conductive terminals, the second main body portion comprises a third rib protruding toward the first ground terminal and a fourth rib protruding toward the second ground terminal;

wherein the first rib and the third rib respectively contact opposite side surfaces of the first connection portion of the first ground terminal; the second rib and the fourth rib respectively contact opposite side surfaces of the first connection portion of the second ground terminal; and wherein the first main body portion, the second main body portion, the first ground terminal and the second ground terminal are enclosed to form a shielding cavity to accommodate the first connection portion of the first differential signal terminal.

11. A first connector assembly, comprising:

a metal shell, the metal shell comprising a first end surface and an installation space extending through the first end surface; and a first connector, the first connector being at least partially received in the installation space, the first connector comprising a first housing and a plurality of first terminal modules, the plurality of first terminal modules being arranged side by side and assembled to the first housing;

wherein at least one first terminal module comprises a plurality of first conductive terminals, the plurality of first conductive terminals comprise a first differential signal terminal, a first ground terminal and a second ground terminal, and the first differential signal terminal is located between the first ground terminal and the second ground terminal;

wherein there are a plurality of the first differential signal terminals, there are a plurality of the first ground terminals, and there are a plurality of second ground terminals;

wherein the first terminal module is located in a plane; and wherein the plurality of first ground terminals, the plurality of first differential signal terminals, and the plurality of second ground terminals are stacked and separated by a distance in the plane; and wherein the first differential signal terminals are divided into at least three pairs, and each pair of first differential signal terminals are located between one said first ground terminal and one said second ground terminal.

12. The first connector assembly according to claim 1, wherein a structure of the mating portion of the first differential signal terminal is different from a structure of the mating portion of the first ground terminal and a structure of the mating portion of the second ground terminal; and wherein the mating portion of the first ground terminal and the mating portion of the second ground terminal are flat-shaped, and the mating portion of the first differential signal terminal is needle-shaped.

13. A second connector assembly, comprising:

a metal cage, the metal cage comprising a second end surface and a mating space extending through the second end surface, the mating space being configured to receive a first connector along a first direction; and a second connector, the second connector being located at a rear end of the mating space and communicating with the mating space, the second connector comprising a second housing and a plurality of second terminal modules assembled to the second housing;

wherein at least one second terminal module comprises a pair of second differential signal terminals, a grounding element located beside the pair of second differential signal terminals along a second direction perpendicular to the first direction, and a second cable electrically connected to the second differential signal terminals;

wherein the at least one second terminal module comprises an insulating block and an insulating member fixed to the second differential signal terminals, the grounding element comprises a metal shield surrounding member surrounding a periphery of the second differential signal terminals, the insulating block defines a through hole, each second differential signal terminal comprises a contact arm located in the through hole, and the insulating block is received in the metal shield surrounding member.

14. The second connector assembly according to claim 13, wherein the metal cage comprises a second top wall, a second bottom wall, a third side wall, and a fourth side wall; the mating space is enclosed by the second top wall, the second bottom wall, the third side wall, and the fourth side wall; wherein the second connector assembly further comprises a plurality of grounding elastic pieces adjacent to the second end surface, the plurality of grounding elastic pieces are fixed to the second top wall, the second bottom wall, the third side wall, and the fourth side wall, respectively;

wherein the second connector assembly comprises a second heat sink fixed to the second top wall and/or the second bottom wall.

15. The second connector assembly according to claim 13, wherein a plurality of second terminal modules are provided, each second terminal module comprises an insulating part and a grounding member, the second differential signal terminals comprise a first signal terminal and a second signal terminal, the first signal terminal and the second signal terminal form a differential pair and are fixed to the insulating part, and the grounding member is located adjacent to the second differential signal terminals along a third direction perpendicular to the first direction and the second direction.

16. The second connector assembly according to claim 13, wherein the second connector is a backplane connector.

17. The second connector assembly according to claim 13, wherein the at least one second terminal module comprises a plurality of second conductive terminals which comprise the pair of second differential signal terminals, a plurality of the second cables are provided, and all the second conductive terminals are connected to corresponding second cables.

18. The second connector assembly according to claim 13, wherein at least one second terminal module comprises a second cable electrically connected to the pair of second differential signal terminals, the second cable comprises a core electrically connected to a corresponding second differential signal terminal and a grounding wire located outside the core, the at least one second terminal module further comprises a metal shield plate and a connecting piece connecting the grounding wire and the metal shield surrounding member, and the metal shield plate is in contact with the metal shield surrounding member.

19. The first connector assembly according to claim 1, wherein there are a plurality of the first differential signal terminals, there are a plurality of the first ground terminals, and there are a plurality of second ground terminals;

wherein the first terminal module is located in a plane; and wherein the plurality of first ground terminals, the plurality of first differential signal terminals, and the plurality of second ground terminals are stacked and separated by a distance in the plane; and wherein the first differential signal terminals are divided into at least three pairs, and each pair of first differential signal terminals are located between one said first ground terminal and one said second ground terminal.

20. The second connector assembly according to claim 11, wherein each first conductive terminal comprises a first connection portion and a mating portion;

the at least one first terminal module further comprises:

an insulating bracket, the insulating bracket being secured to the first connection portion;

a first metal shield, the first metal shield being located on one side of the insulating bracket; and a second metal shield, the second metal shield being located on another side of the insulating bracket.

* * * * *